US011942722B2

(12) United States Patent
DiFonzo et al.

(10) Patent No.: US 11,942,722 B2
(45) **Date of Patent: *Mar. 26, 2024**

(54) MAGNETIC CIRCUIT FOR MAGNETIC CONNECTOR

(71) Applicant: Apple Inc., Cupertino, CA (US)

(72) Inventors: John C. DiFonzo, Emerald Hills, CA (US); Bradley J. Hamel, Redwood City, CA (US); George Tziviskos, San Jose, CA (US); Hao Zhu, San Jose, CA (US); Jean-Marc Gery, Playa Del Rey, CA (US); Paul J. Hack, San Jose, CA (US)

(73) Assignee: Apple Inc., Cupertino, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 17/543,487

(22) Filed: Dec. 6, 2021

(65) Prior Publication Data

US 2022/0102911 A1 Mar. 31, 2022

Related U.S. Application Data

(63) Continuation-in-part of application No. 17/033,514, filed on Sep. 25, 2020, now Pat. No. 11,437,747.

(Continued)

(51) Int. Cl.

*H01R 13/62* (2006.01)
*H01R 13/24* (2006.01)

(Continued)

(52) U.S. Cl.

CPC ..... *H01R 13/6205* (2013.01); *H01R 13/2421* (2013.01); *H01R 13/629* (2013.01); *H01R 13/6581* (2013.01)

(58) Field of Classification Search

CPC . H01R 13/6205; H01R 13/17; H01R 13/2421

See application file for complete search history.

(56) References Cited

U.S. PATENT DOCUMENTS

| | | | |
|---|---|---|---|
| 2,644,145 | A | 6/1953 | Adams |
| 3,378,810 | A | 4/1968 | Dorrell |

(Continued)

FOREIGN PATENT DOCUMENTS

| | | |
|---|---|---|
| JP | 508785 | 3/1975 |
| JP | 6276668 | 5/1987 |

(Continued)

OTHER PUBLICATIONS

U.S. Appl. No. 17/033,514 , "First Action Interview Pilot Program Pre-Interview Communication", dated Dec. 20, 2021, 6 pages.

(Continued)

*Primary Examiner* — Neil Abrams

(74) *Attorney, Agent, or Firm* — Kilpatrick Townsend & Stockton LLP

(57) ABSTRACT

Connector inserts having reliable contacts, as well as connector receptacles having improved magnetic circuits for use in electronic devices having a thin form factor. These and other examples can provide connector receptacles that can be easily aligned to an opening in an electronic device, as well as connector inserts and connector receptacles that can be readily manufactured.

20 Claims, 23 Drawing Sheets

Related U.S. Application Data

(60) Provisional application No. 63/259,910, filed on Sep. 24, 2021.

(51) Int. Cl.
*H01R 13/629* (2006.01)
*H01R 13/6581* (2011.01)

(56) References Cited

U.S. PATENT DOCUMENTS

| | | | |
|---|---|---|---|
| 3,435,168 | A | 3/1969 | Cooney |
| 3,753,103 | A | 8/1973 | Tetreault et al. |
| 4,050,762 | A | 9/1977 | Hines et al. |
| 4,397,519 | A | 8/1983 | Cooney |
| 4,597,622 | A | 7/1986 | Coe |
| 4,612,703 | A * | 9/1986 | Cooney .................. H01R 13/03 72/47 |
| 4,686,465 | A | 8/1987 | Kruger |
| 4,874,316 | A | 10/1989 | Kamon et al. |
| 4,983,909 | A | 1/1991 | Swart et al. |
| 5,417,595 | A | 5/1995 | Cullen et al. |
| 5,801,544 | A | 9/1998 | Swart et al. |
| 5,909,100 | A * | 6/1999 | Watanabe ............. B60L 53/126 320/108 |
| 5,993,269 | A | 11/1999 | Ito |
| 6,053,777 | A | 4/2000 | Boyle |
| 6,159,056 | A | 12/2000 | Boyle |
| 6,377,059 | B2 | 4/2002 | Vinther et al. |
| 6,447,328 | B1 | 9/2002 | Feldman |
| 6,506,082 | B1 | 1/2003 | Meek et al. |
| 6,604,864 | B2 | 8/2003 | Nguyen |
| 6,696,850 | B1 | 2/2004 | Sanders |
| 6,758,682 | B1 | 7/2004 | Kosmala |
| 6,861,862 | B1 | 3/2005 | Tate |
| 6,957,986 | B2 | 10/2005 | Jing |
| 7,252,512 | B2 * | 8/2007 | Tai ..................... H01R 13/6205 439/39 |
| 7,311,526 | B2 | 12/2007 | Rohrbach et al. |
| 7,315,176 | B2 | 1/2008 | Nelson et al. |
| 7,611,389 | B2 | 11/2009 | Toivanen et al. |
| 7,682,206 | B2 | 3/2010 | Kainz |
| 7,749,032 | B1 | 7/2010 | Yin et al. |
| 7,775,801 | B2 | 8/2010 | Shiff et al. |
| 7,798,867 | B2 | 9/2010 | Sanders |
| 8,043,103 | B2 | 10/2011 | Yamada et al. |
| 8,337,256 | B1 | 12/2012 | Lin |
| 8,734,189 | B2 | 5/2014 | Kim |
| 8,905,795 | B2 | 12/2014 | Kim et al. |
| 8,926,376 | B2 | 1/2015 | Mori |
| 9,130,317 | B2 * | 9/2015 | Wang ................. H01R 13/6683 |
| 9,252,531 | B2 * | 2/2016 | Guo ................... H01R 13/6205 |
| 9,300,081 | B2 * | 3/2016 | Rudisill ................. H01R 11/30 |
| 9,431,742 | B2 | 8/2016 | DiFonzo et al. |
| 9,748,680 | B1 | 8/2017 | Huang et al. |
| 9,780,475 | B2 | 10/2017 | Kim et al. |
| 9,780,484 | B2 | 10/2017 | DiFonzo et al. |
| 10,114,038 | B2 | 10/2018 | Tong et al. |
| 10,367,279 | B2 | 7/2019 | Mardi |
| 10,566,734 | B1 * | 2/2020 | Pabouctsidis ...... H01R 13/6205 |
| 11,437,747 | B2 * | 9/2022 | Tziviskos .............. H01R 13/17 |
| 2003/0124895 | A1 | 7/2003 | Winter et al. |
| 2003/0176113 | A1 | 9/2003 | Sasaki |
| 2004/0137800 | A1 | 7/2004 | Jing |
| 2010/0089187 | A1 | 4/2010 | Yin et al. |
| 2011/0018567 | A1 | 1/2011 | Shiga |
| 2011/0070747 | A1 | 3/2011 | Ball |
| 2013/0095690 | A1 | 4/2013 | Kim et al. |
| 2013/0330983 | A1 | 12/2013 | DiFonzo et al. |
| 2016/0020542 | A1 | 1/2016 | DiFonzo et al. |
| 2018/0191097 | A1 * | 7/2018 | Yonnet ............... H01R 13/6205 |
| 2021/0336382 | A1 * | 10/2021 | Klein ................. H01R 13/6205 |
| 2022/0102893 | A1 | 3/2022 | Tziviskos |
| 2022/0102910 | A1 * | 3/2022 | DiFonzo ............ H01R 13/6205 |
| 2022/0102911 | A1 * | 3/2022 | DiFonzo .............. H01R 13/629 |

FOREIGN PATENT DOCUMENTS

| | | |
|---|---|---|
| JP | 6323655 | 2/1988 |
| JP | 63274070 | 11/1988 |
| JP | 972932 | 3/1997 |
| JP | 1040990 | 2/1998 |
| JP | 10282142 | 10/1998 |
| JP | 10332767 | 12/1998 |
| JP | 2001021583 | 1/2001 |
| JP | 2002174642 | 6/2002 |
| JP | 2003281984 | 10/2003 |
| JP | 2004179066 | 6/2004 |
| JP | 2005005146 | 1/2005 |
| JP | 2006501475 | 1/2006 |
| JP | 2007316023 | 12/2007 |
| JP | 2011027549 | 2/2011 |
| JP | 2011192407 | 9/2011 |
| JP | 2013068593 | 4/2013 |
| KR | 200255378 | 11/2001 |
| TW | 200301592 | 7/2003 |
| TW | 563929 | 11/2003 |
| TW | M312806 | 5/2007 |
| TW | I286409 | 9/2007 |
| TW | I289376 | 11/2007 |
| TW | 200803072 | 1/2008 |
| TW | M406183 | 6/2011 |
| WO | 9804018 | 1/1998 |
| WO | 2005053106 | 6/2005 |
| WO | 2013035399 | 3/2013 |

OTHER PUBLICATIONS

U.S. Appl. No. 17/033,514 , "Notice of Allowance", dated Apr. 29, 2022, 7 pages.

* cited by examiner

MAGNETIC CIRCUIT FOR MAGNETIC CONNECTOR

CROSS-REFERENCES TO RELATED APPLICATIONS

This application is a continuation-in-part of U.S. patent application Ser. No. 17/033,514, filed Sep. 25, 2020, and claims priority to U.S. provisional patent application 63/259,910, filed Sep. 24, 2021, which are incorporated by reference.

BACKGROUND

The number of types of electronic devices that are commercially available has increased tremendously the past few years and the rate of introduction of new devices shows no signs of abating. Devices such as tablet computers, laptop computers, desktop computers, all-in-one computers, cell phones, storage devices, wearable-computing devices, portable media players, navigation systems, monitors, adapters, and others, have become ubiquitous.

Electronic devices can share power and data over cables that can include one or more wires, fiber optic lines, or other conductors. Connector inserts can be located at each end of these cables and can be inserted into connector receptacles in the communicating electronic devices to form pathways for power and data.

A connector insert can have contacts that mate with corresponding contacts in a connector receptacle. These contacts can form portions of electrical paths for data, power, or other types of signals. One type of contact, a spring-loaded contact, can be used in either a connector insert or a connector receptacle. But a spring-loaded contact can have a reduced reliability, particularly if currents for a power supply flow through the spring.

A connector receptacle can be positioned in an opening in an electronic device. In many devices, this opening can be on a side of the electronic device. But these electronic devices are becoming thinner, making such positioning increasing difficult. This difficulty can be particularly exacerbated when the connector receptacle is a magnetic connector. For example, it can be difficult to provide sufficient magnetic force in a low-profile connector receptacle to reliably hold a corresponding connector insert.

Thus, what is needed are connector inserts having reliable contacts, as well as connector receptacles having improved magnetic circuits for use in electronic devices having a thin form factor.

SUMMARY

Accordingly, embodiments of the present invention can provide connector inserts having reliable contacts, as well as connector receptacles having improved magnetic circuits for use in electronic devices having a thin form factor. These and other embodiments of the present invention can further provide connector receptacles that can be easily aligned to an opening in an electronic device, as well as connector inserts and connector receptacles that can be readily manufactured.

An illustrative embodiment of the present invention can provide contacts for connector inserts and connector receptacles that are highly reliable. These contacts can be spring-loaded contacts having a contacting portion or plunger biased by a spring or other biasing structure. As a connection is made between a spring-loaded contact and a corresponding contact, the biased plunger can be depressed. As a result, the spring can apply a force between the plunger and the corresponding contact to form an electrical connection. Current in the electrical connection can flow through the plunger and a barrel or other housing for the plunger that is in contact with the plunger. But in some circumstances, as the plunger is depressed, contact between the plunger and the barrel can be broken. When this happens, current can flow through the spring. If the contact is a power supply contact, the current can damage or destroy the spring thereby rendering the contact and possibly the connector inoperable.

Accordingly, an illustrative embodiment of the present invention can provide spring-biased contacts that include an intermediate object between a plunger and a spring or other biasing structure. The intermediate object can have a first length that is greater than an inner diameter of a barrel that houses the plunger, spring and intermediate object. The intermediate object can be between a backside of the plunger and the spring, where the intermediate object simultaneously contacts an inside surface of barrel at a first location and a second location. The first location and the second location can be on opposite sides of the intermediate object. The first location can be a first distance from a front opening of the barrel and the second location can be a second distance from the front opening of the barrel, where the first distance is different than the second distance.

In these and other embodiments of the present invention, an inside surface of the barrel can provide a first force along a first vector against the intermediate object at the first location and the inside surface of the barrel can provide a second force along a second vector against the intermediate object at the second location. The first force vector and the second force vector can be parallel and non-overlapping.

The intermediate object can have various shapes. For example, the intermediate object can have a capsule shape. The intermediate object can have a stadium-of-rotation shape. The intermediate object can have a spherocylinder shape. The intermediate object can have a shape defined by two hemispheres separated by a cylinder.

In these and other embodiments of the present invention, an interface between the plunger and the intermediate object can be arranged to provide a force between the intermediate object and the barrel as well as a force between the plunger and the barrel. For example, a backside of the plunger can have a sloped surface. The backside of the plunger can have a conical surface. The backside of the plunger can have an off-center conical surface. The backside of the plunger can have a sloped off-center conical surface. The contact can be one of several contacts in a connector receptacle or connector insert.

These and other embodiments of the present invention can provide a connector system having an improved magnetic circuit This magnetic circuit can provide a magnet array arranged to provide a strong attachment that allows the use of a low profile connector receptacle and connector insert. The magnet array can include magnets and magnetic elements, where the magnetic elements can be magnetically conductive pole pieces. Each pole piece can have magnets at two or more of its sides. The magnets can be arranged in an alternating manner such that the field lines of the pole pieces provide a strong magnetic attachment to a magnetically conductive attraction plate of a corresponding connector. The magnetic circuit can further include the attraction plate, which can be arranged to be attracted to the magnet array and to fit in a connector that houses the magnet array.

An illustrative embodiment of the present invention can provide a connector receptacle that can be easily aligned with an opening in a device enclosure for an electronic device. The electronic device can include a printed circuit board or other substrate, and can be at least partially housed in a device enclosure. The device enclosure can have an opening. A connector receptacle can be mounted on a portion of the device enclosure, the board, or other substrate. The connector receptacle can be attached to the enclosure or board using brackets. The brackets can be positionable within a housing of the connector receptacle such that the connector receptacle can be positionable within the electronic device in at least one dimension. This can allow the connector receptacle to be aligned with the opening in the device enclosure of the electronic device.

While embodiments of the present invention can provide connector inserts and connector receptacles for delivering power, these and other embodiments of the present invention can be used as connector receptacles in other types of connector systems, such as connector systems that can be used to convey power, data, or both.

In various embodiments of the present invention, contacts, shields, plungers, springs, intermediate objects, pistons, barrels, and other conductive portions of a connector receptacle or connector insert can be formed by stamping, metal-injection molding, machining, CNC machining, micro-machining, 3-D printing, or other manufacturing process. The conductive portions can be formed of stainless steel, steel, copper, copper titanium, phosphor bronze, or other material or combination of materials. They can be plated or coated with nickel, gold, or other material. The nonconductive portions, such as housings, locks, pistons, and other structures can be formed using injection or other molding, 3-D printing, machining, or other manufacturing process. The nonconductive portions can be formed of silicon or silicone, rubber, hard rubber, plastic, nylon, glass-filled nylon, liquid-crystal polymers (LCPs), ceramics, or other nonconductive material or combination of materials. The printed circuit boards or other boards used can be formed of FR-4 or other material. The magnets can be permanent magnets formed of recycled rare-earth magnets, other rare-earth magnets, or other magnetic elements.

Embodiments of the present invention can provide connector receptacles and connector inserts that can be located in, and can connect to, various types of devices such as portable computing devices, tablet computers, desktop computers, laptops, all-in-one computers, wearable computing devices, smart phones, storage devices, portable media players, navigation systems, monitors, power supplies, video delivery systems, adapters, remote control devices, chargers, and other devices. These connector receptacles and connector inserts can provide interconnect pathways for signals that are compliant with various standards such as one of the Universal Serial Bus (USB) standards including USB Type-C, High-Definition Multimedia Interface® (HDMI), Digital Visual Interface (DVI), Ethernet, DisplayPort, Thunderbolt™, Lightning™, Joint Test Action Group (JTAG), test-access-port (TAP), Peripheral Component Interconnect express, Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future. Other embodiments of the present invention can provide connector receptacles and connector inserts that can be used to provide a reduced set of functions for one or more of these standards. In various embodiments of the present invention, these interconnect paths provided by these connector receptacles and connector inserts can be used to convey power, ground, signals, test points, and other voltage, current, data, or other information.

Various embodiments of the present invention can incorporate one or more of these and the other features described herein. A better understanding of the nature and advantages of the present invention can be gained by reference to the following detailed description and the accompanying drawings.

DESCRIPTION OF ILLUSTRATIVE EMBODIMENTS

Figure 1:
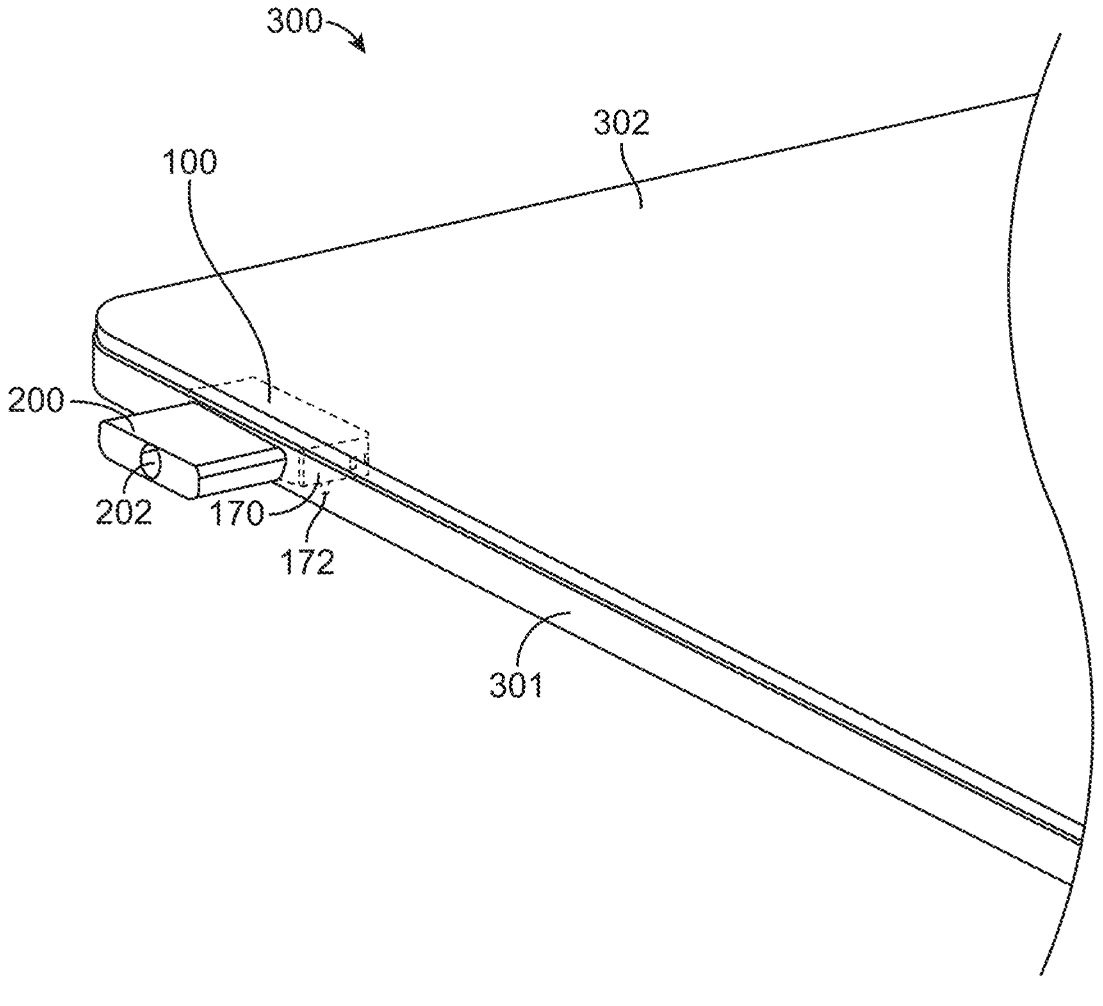
FIG. 1 illustrates an electronic system that can be improved by the incorporation of embodiments of the present invention.

FIG. 1 illustrates an electronic system that can be improved by the incorporation of an embodiment of the present invention. This figure, as with the other included figures, is shown for illustrative purposes and does not limit either the possible embodiments of the present invention or the claims.

This figure illustrates an electronic device 300 including connector receptacle 100. Electronic device 300 can include bottom enclosure 301 encasing connector receptacle 100. Electronic device 300 can further include top enclosure 302 over bottom enclosure 301. Top enclosure 302 can house a screen or monitor, or other electronic components (not shown.) Bottom enclosure 301 can house a keyboard, processor, battery, or other electronic components (not shown.) The electronic components in top enclosure 302 and bottom enclosure 301 can receive and provide power and data using connector receptacle 100. In one example, the electronic components in top enclosure 302 and bottom enclosure 301 can receive power via connector receptacle 100 and can provide data regarding a charging status of a battery (not shown) of electronic device 300 via connector receptacle 100.

Connector receptacle 100 can include shield 170 having tabs 172. Tabs 172 can be inserted into and soldered to openings (not shown) in a printed circuit board (not shown) in bottom enclosure 301 of electronic device 300. Connector insert 200 can be plugged into or mated with connector receptacle 100. Connector insert 200 can include passage 202 for a cable (not shown.)

In this example, electronic device 300 can be a laptop or portable computer. In these and other embodiments of the present invention, electronic device 300 can instead be another portable computing device, tablet computer, desktop computer, all-in-one computer, wearable-computing device, smart phone, storage device, portable media player, navigation system, monitor, power supply, video delivery system, adapter, remote control device, charger, or other device.

Examples of connector receptacles 100 and connector inserts 200 are shown in the following figures.

Figure 2:
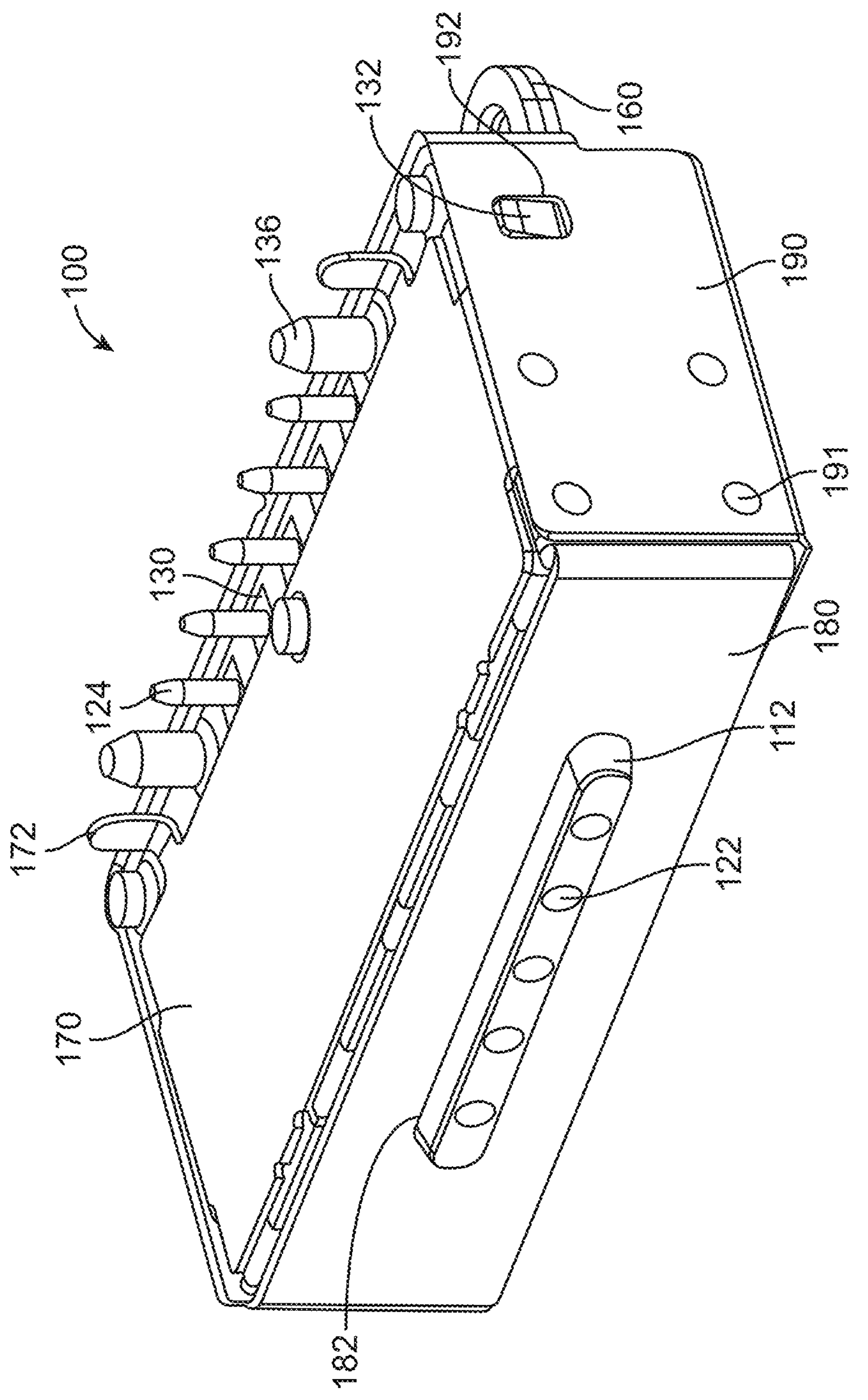
FIG. 2 illustrates a connector receptacle according to an embodiment of the present invention.

FIG. 2 illustrates a connector receptacle according to an embodiment of the present invention. Connector receptacle 100 can include mesa 112 supporting contacting surfaces 122 of contacts 120 (shown in FIG. 4.) Mesa 112 can emerge through opening 182 in faceplate 180. Contacts 120 can terminate in through-hole contacting portions 124. In these and other embodiments of the present invention, contacts 120 can terminate in surface-mount contacting portions (not shown.) Housing 130 can include posts 136. Shield 170 can include tabs 172. Through-hole contacting portions 124, posts 136, and tabs 172 can be inserted into corresponding openings in a printed circuit board, flexible circuit board, or other appropriate substrate 620 (shown in FIG. 6.) Housing 130 can further include tab 132 that can fit an opening 192 of shield 190. Shield 170 can be attached to shield 190 at points 191 by spot or laser-welding or other technique. Bracket 160 can be used to secure connector receptacle 100 in place in electronic device 300 (shown in FIG. 1) as shown further below.

Figure 3:
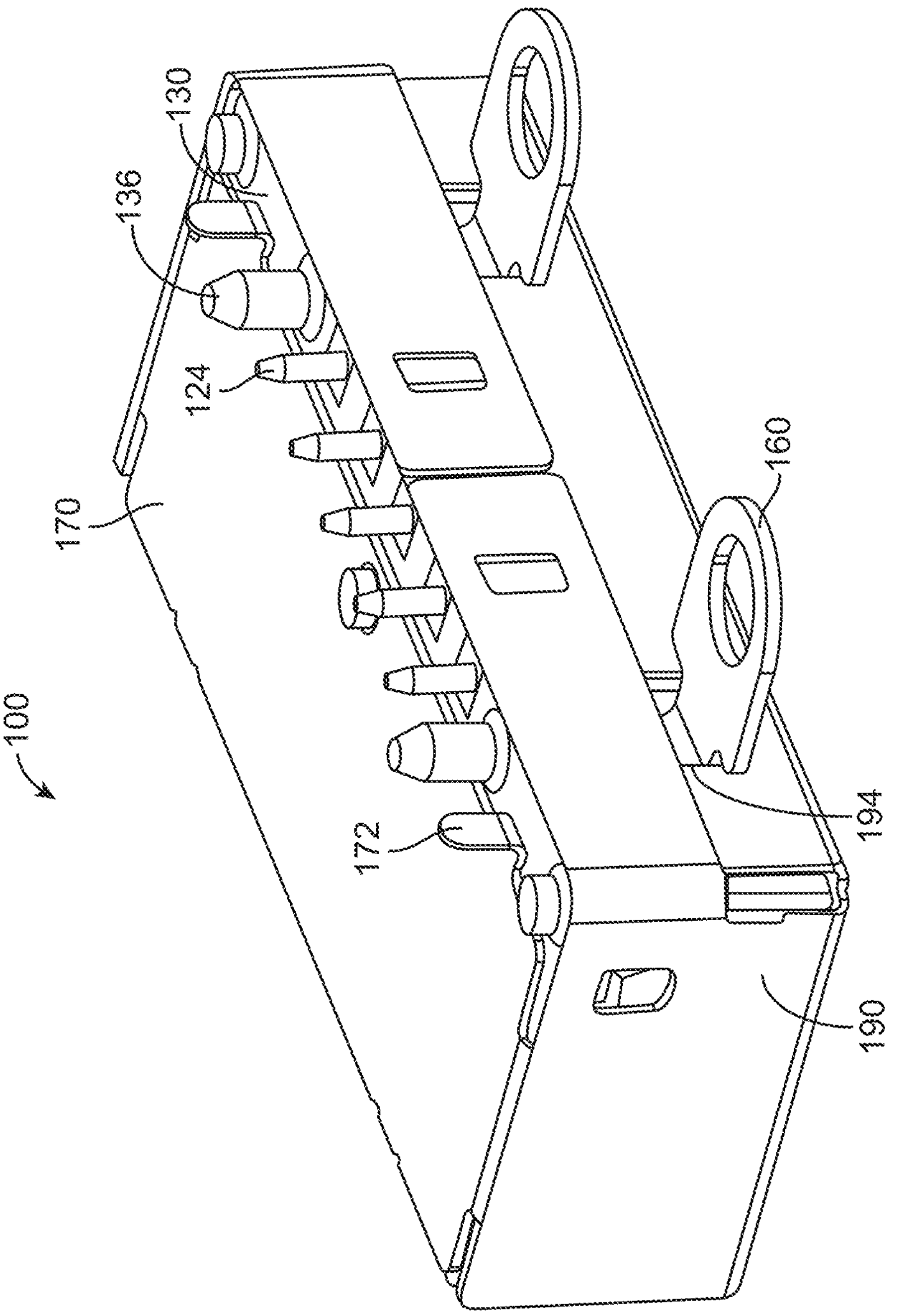
FIG. 3 illustrates the connector receptacle of FIG. 2.

FIG. 3 illustrates the connector receptacle of FIG. 2. Brackets 160 can emerge through the openings 194 in shield 190. Shield 170 can include tabs 172. Contacts 120 (shown in FIG. 4) can terminate in through-hole contacting portions 124. Housing 130 can include posts 136. Through-hole contacting portions 124, posts 136, and tabs 172 can be fit in corresponding openings in a printed circuit board, flexible circuit board, or other appropriate substrate 620 (shown in FIG. 6.) Brackets 160 can be used secure connector receptacle 100 in place in electronic device 300 (shown in FIG. 1.)

Figure 4:
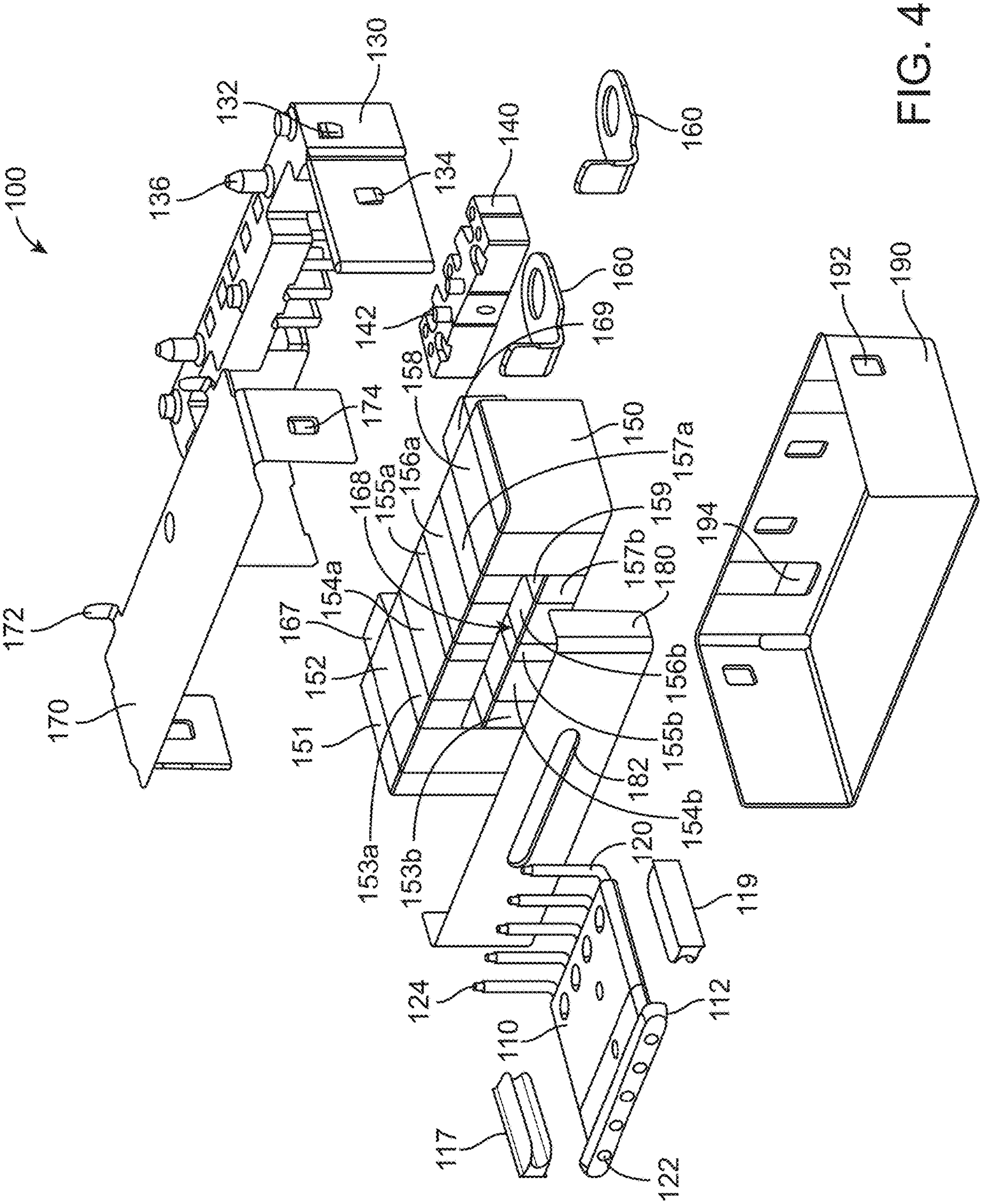
FIG. 4 is an exploded view of the connector receptacle of FIG. 2.

FIG. 4 is an exploded view of the connector receptacle of FIG. 2. Contacts 120 can be supported by contact housing 110. Contact housing 110 can terminate in mesa 112. Contacts 120 can include contacting surfaces 122 on mesa 112 and through-hole contacting portions 124. Mesa 112 can emerge from opening 182 in faceplate 180. Faceplate 180 can protect magnet array 150. Faceplate 180 can be formed of a soft magnetic alloy to optimize the attachment force between magnet array 150 and attraction plate 250 (shown in FIG. 8.) For example, faceplate 180 can be formed of a soft magnetic alloy or other magnetically conductive material, such as martensitic stainless steel, ferritic stainless steel, low-carbon steel, iron-cobalt, an iron-silicon or nickel-iron alloy, or other ferro-magnetic material, or other material.

Magnet array 150 can be positioned around contact housing 110. Contact housing 110 can pass through an opening 168 in magnet array 150. Magnet array 150 can include pole piece 152, pole piece **154*a*, pole piece 154*b*, pole piece 156*a*, pole piece 156*b*, and pole piece 158. Magnet array 150 can include magnet 151, magnet 153*a*, magnet 153*b*, magnet 155*a*, magnet 155*b*, magnet 157*a*, magnet 157*b*, and magnet 159**. Each of pole piece can be formed of a soft magnetic alloy or other magnetically conductive material, such as martensitic stainless steel, ferritic stainless steel, low-carbon steel, iron-cobalt, an iron-silicon or nickel-iron alloy, or other ferro-magnetic material, or other material.

Each of these pole pieces can be abutted by two or more magnets. For example, pole piece 152 can be abutted by magnet 151, magnet **153*a*, and magnet 153*b*. Pole piece 152 can guide field lines of magnet 151, magnet 153*a*, and magnet 153*b*. For example, magnet 151, magnet 153*a*, and magnet 153*b* can have their north pole adjacent to pole piece 152 and their south pole away from pole piece 152, such that pole piece 152 can guide field lines from their north poles. Alternatively, magnet 151, magnet 153*a*, and magnet 153*b* can have their south pole adjacent to pole piece 152 and their north pole away from pole piece 152, such that pole piece 152 can guide field lines to their south poles. Pole piece 152, pole piece 154*a*, pole piece 154*b*, pole piece 156*a*, pole piece 156*b*, and pole piece 158 can guide field lines of alternating polarities. For example, pole piece 152, pole piece 156*a*, and pole piece 156*b* can guide field lines of a first polarity, while pole piece 154*a*, pole piece 154*b*, and pole piece 158 can guide field lines of a second polarity. Additional magnet 167 and additional magnet 169 can be included in magnet array 150. For example, additional magnet 167 can be adjacent to pole piece 152. In the example where magnet 151, magnet 153*a*, and magnet 153*b* have their north poles adjacent to pole piece 152, additional magnet 167 can also have its north pole adjacent to pole piece 152 while the south pole of additional magnet 167 can face away from pole piece 152. Additional magnet 167 and additional magnet 169 can further increase a magnetic attraction provided at a face of connector receptacle 100. Further details of magnet array 150 can be found in FIG. 21 and FIG. 22** below.

Contact housing 110 can further be supported by housing 130 and lock 140. Contact housing 110 can be positioned between housing 130 and lock 140. Housing 130 can include post 136, tabs 132, and tabs 134. Tab 132 can fit in opening 192 of shield 190. Tab 134 can fit in opening 174 of shield 170. Shield 170 can further include tabs 172. Lock 140 can include posts 142, which can fit in corresponding notches (not shown) in housing 130. Brackets 160 can fit in openings 194 of shield 190. In these and other embodiments of the present invention, brackets 160 can be replaced with a single bracket, such as bracket 2360 (shown in FIG. 23.)

In these and other embodiments of the present invention, connector receptacle 100 can be located in an electronic device that also includes speakers, haptic components, actuators, or other components. These can cause vibrations in nearby components, such as connector receptacle 100, that can result in audible noise. Similarly, the magnetic field generated by magnet array 150 interacting with variable current flowing through contacts 120 can also induce vibrations resulting in audible noise. Accordingly, embodiments of the present invention can provide dampeners that can reduce the tendency of connector receptacle 100 to generate vibrational noise. These dampeners can also protect magnet array 150 from cracking, chipping, or other damage. For example, foam pieces, adhesives, silicone, plastic insulators, elastomers, and other materials or structures can be placed or formed between or among portions of connector receptacle 100. These can be formed of epoxy, room-temperature-vulcanizing silicone or other silicone or other elastomeric material, or other material. For example, dampeners can be placed between magnet array 150 and shield 170, between magnet array 150 and shield 190, between magnet array 150 and faceplate 180, between contact housing 110 and magnet array 150, or elsewhere in connector receptacle 100.

Silicone, such as a room-temperature-vulcanizing silicone, can be placed between contact housing 110 and magnet array 150. For example, silicone can be placed or formed along sides of contact housing 110, along top and bottom sides of contact housing 110, or a combination thereof. The silicone or other material can be formed ahead of time and placed in the desired location. The silicone or other material can instead be injected between contact housing 110 and magnet array 150 and cured in place. In this example, silicone can be injected between sides of contact housing 110 and pole piece 152, and between contact housing 110 and pole piece 158 to form dampener 117 and dampener 119, respectively. Dampener 117 can be formed between a left side (as seen from a front of contact receptacle 100) of contact housing 110 and pole piece 152, while dampener 119 can be formed between a right side of contact housing 110 and pole piece 158. The silicone for dampener 117 and dampener 119 can be injected using a needle placed between contact housing 110 and magnet array 150 from a back side (not shown) of magnet array 150 before housing 130 and lock 140 are attached.

Alternatively, dampener 117 and dampener 119 can be formed as pieces of silicon, foam, or other material ahead of time and inserted or otherwise placed between contact housing 110 and magnet array 150. For example, dampener 117 and dampener 119 can be inserted between contact housing 110 and magnet array 150 from a back side of magnet array 150 before housing 130 and lock 140 are attached. Alternatively, dampener 117 and dampener 119 can be attached to sides of contact housing 110, and then magnet array 150 can be formed around contact housing 110, dampener 117, and dampener 119.

It can be desirable to accurately align mesa 112 and contacting surfaces 122 to an opening in bottom enclosure 301 of electronic device 300 (shown in FIG. 1.) Connector receptacle 100 can be positioned on a surface of or associated with bottom enclosure 301. This can help to provide an accurate alignment. However, various manufacturing tolerances can remain. Accordingly, it can be desirable to be able to adjust a connection between connector receptacle 100 and bottom enclosure 301 in at least one direction. An example is shown in the following figure.

Figure 5:
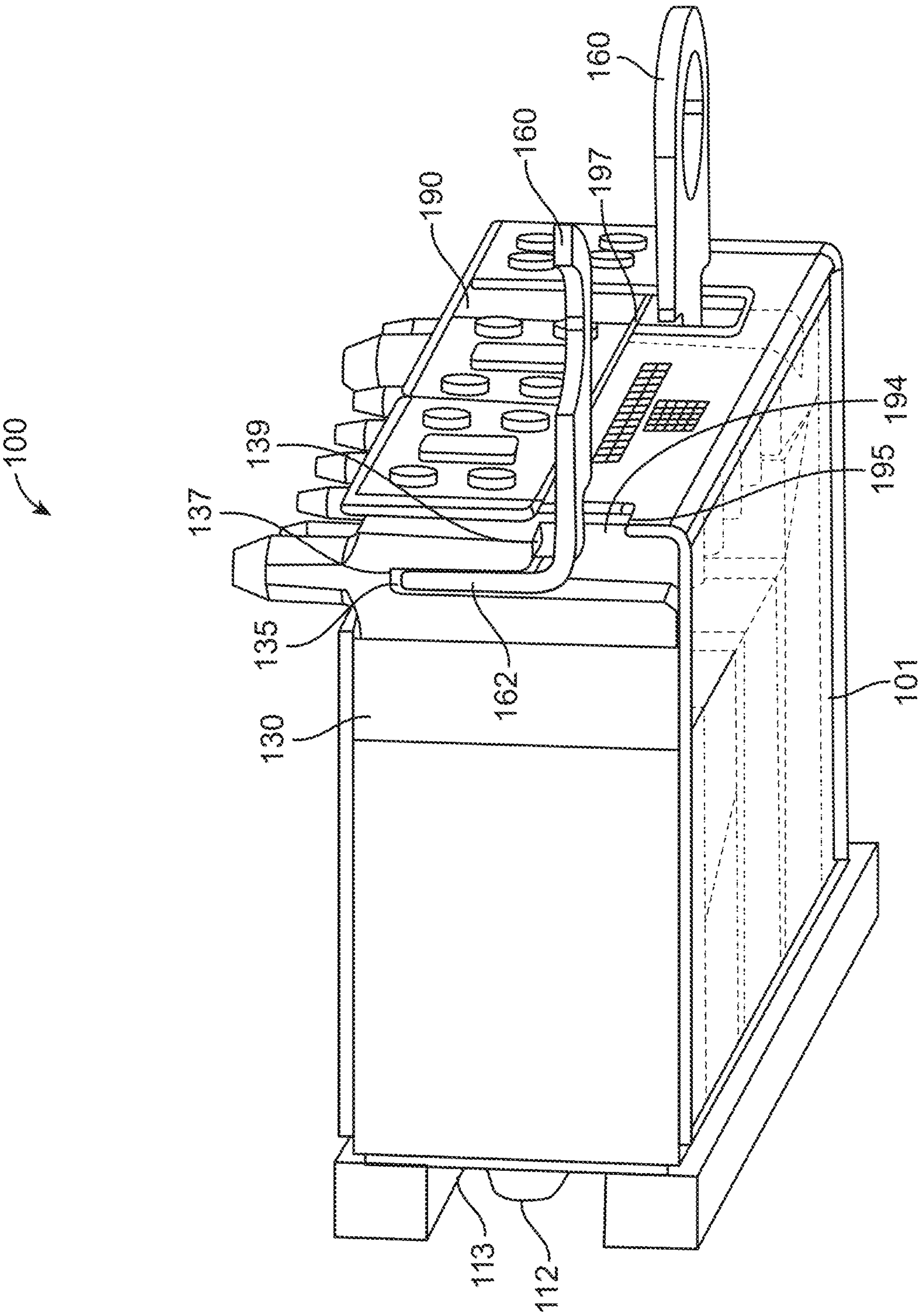
FIG. 5 illustrates a cutaway side view of the connector receptacle of FIG. 2.

FIG. 5 illustrates a cutaway side view of the connector receptacle of FIG. 2. A bottom surface 101 of connector receptacle 100 can be placed near a printed circuit board, enclosure surface, or other appropriate substrate 620 (shown in FIG. 6.) Brackets 160 can be used to secure connector receptacle 100 to substrate 620. To improve alignment of connector receptacle 100 to an opening in bottom enclosure 301 (shown in FIG. 1), it can be desirable that bracket 160 be able to move in at least one direction relative to the other portions of connector receptacle 100. Accordingly, bracket 160 can be positioned in slot 135 in housing 130. In this way, tab 162 of bracket 160 can slide vertically in slot 135. This can allow bracket 160 to move relative to the remainder of connector receptacle 100. This relative movement can allow connector receptacle 100 to be adjusted relative to substrate 620 and allow connector receptacle 100 and mesa 112 (shown in FIG. 4) to be accurately positioned in the opening in bottom enclosure 301.

In this example bracket 160 can be capable of moving up board until tab 162 hits a top 137 of slot 135. Also or instead, the upward travel can be limited by an edge 197 at a top of opening 194 in shield 190. Also or instead, the upward travel can be limited by edge 139 of housing 130 engaging bracket 160. Bracket 160 can be capable of moving downward until bracket 160 hits bottom edge 195 of opening 194. This arrangement can allow bracket 160 to move vertically relative to a remaining portion of connector receptacle 100. In this example, mesa 112 can be located in recess 113. In these and other embodiments of the present invention, brackets 160 can be replaced with a single bracket, or with three or more than three brackets. A single bracket, such as bracket 2360 (shown in FIG. 23) can be used. This single bracket 2360 can be adjustable in a similar manner as brackets 160, or single bracket 2360 can be fixed in place to shield 190.

Figure 6:
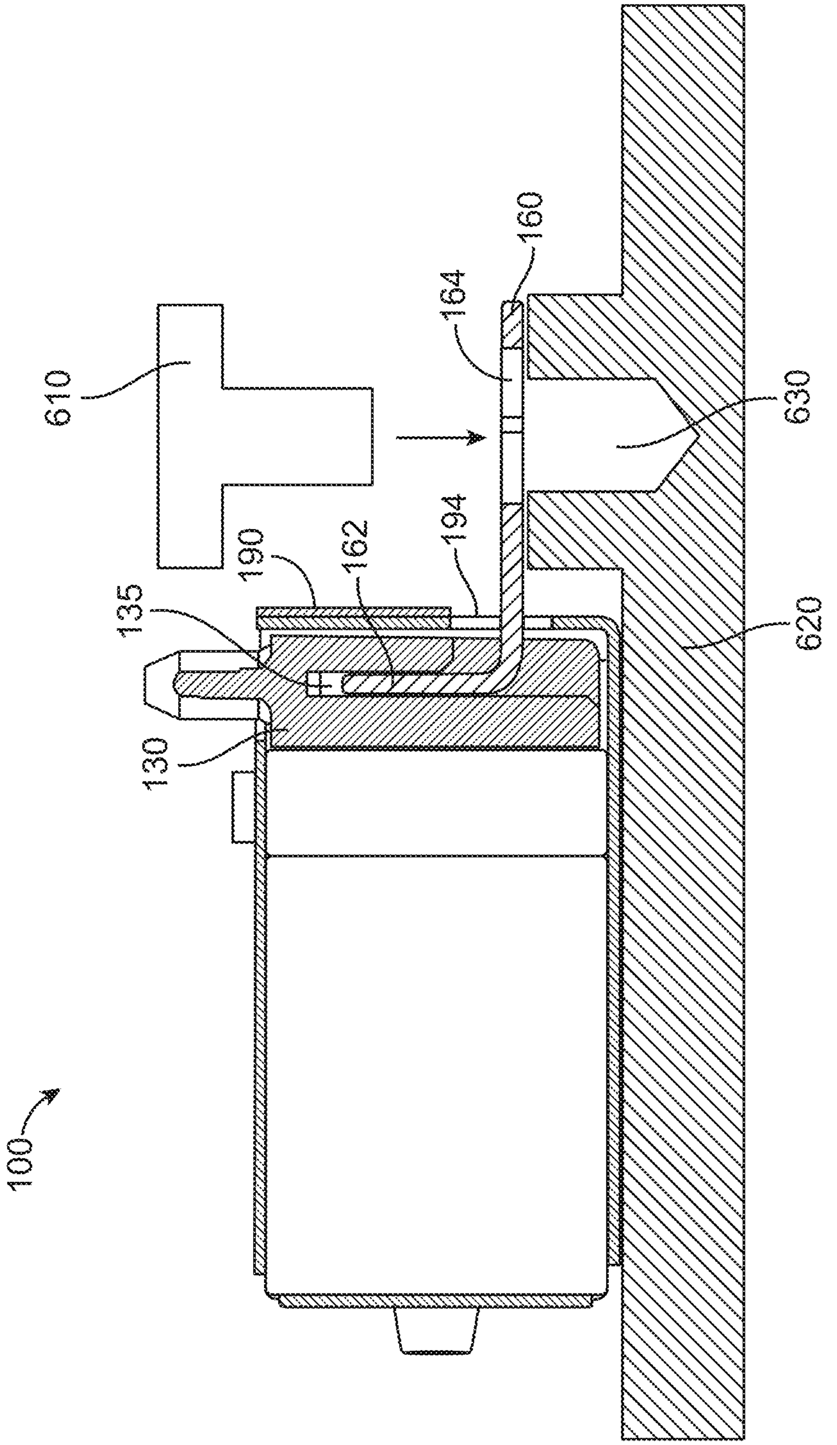
FIG. 6 illustrates a side view of the connector receptacle of FIG. 2 in a device enclosure according to an embodiment of the present invention.

FIG. 6 illustrates a side view of the connector receptacle of FIG. 2 in a device enclosure according to an embodiment of the present invention. In this example, connector receptacle 100 can be attached to substrate 620 via bracket 160. Substrate 620 can be a printed circuit board, portion of bottom enclosure 301 (shown in FIG. 1), or other appropriate substrate. Substrate 620 can include fastener opening 630 to accept fastener 610. Fastener 610 can pass through opening 164 in bracket 160 to secure bracket 160 and connector receptacle 100 to substrate 620. Again, tab 162 of bracket 160 can move vertically in slot 135 of housing 130. Fastener 610 can pass through opening 194 in shield 190. When a bracket, such as bracket 2360 (shown in FIG. 23) is fixed to shield 190, or other structure such as magnetic element 2210 and magnetic element 2220 (shown in FIG. 22), bracket 2360 can be pre-biased (that is, sloped relative to substrate 620 in the illustrated plane) as it extends away from shield 190 and slot 135. This slope can be either towards or away from substrate 620. As fastener 610 is inserted into fastener opening 630 in substrate 620, for example by turning a screw used as fastener 610 into a threaded fastener opening 630, bracket 2360 can flatten (that is, become parallel to substrate 620.) This change can provide a range through which mesa 112 of connector receptacle 100 can be positioned in recess 113 (shown in FIG. 5.)

Figure 7B:
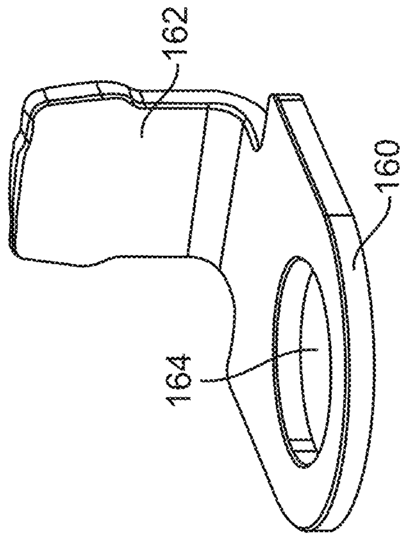
FIG. 7A and FIG. 7B illustrate portions of the connector receptacle of FIG. 2.
Figure 7A:
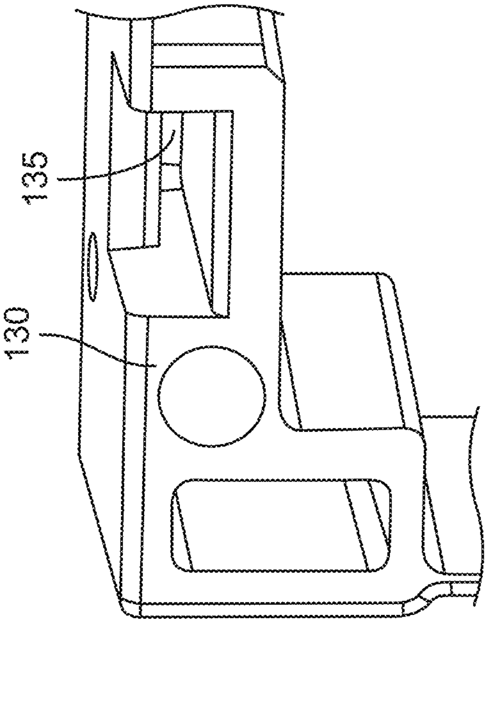

FIG. 7A and FIG. 7B illustrate portions of the connector receptacle of FIG. 2. Housing 130 can include slot 135 for accepting bracket 160. Bracket 160 can include tab 162 and opening 164.

Figure 8:
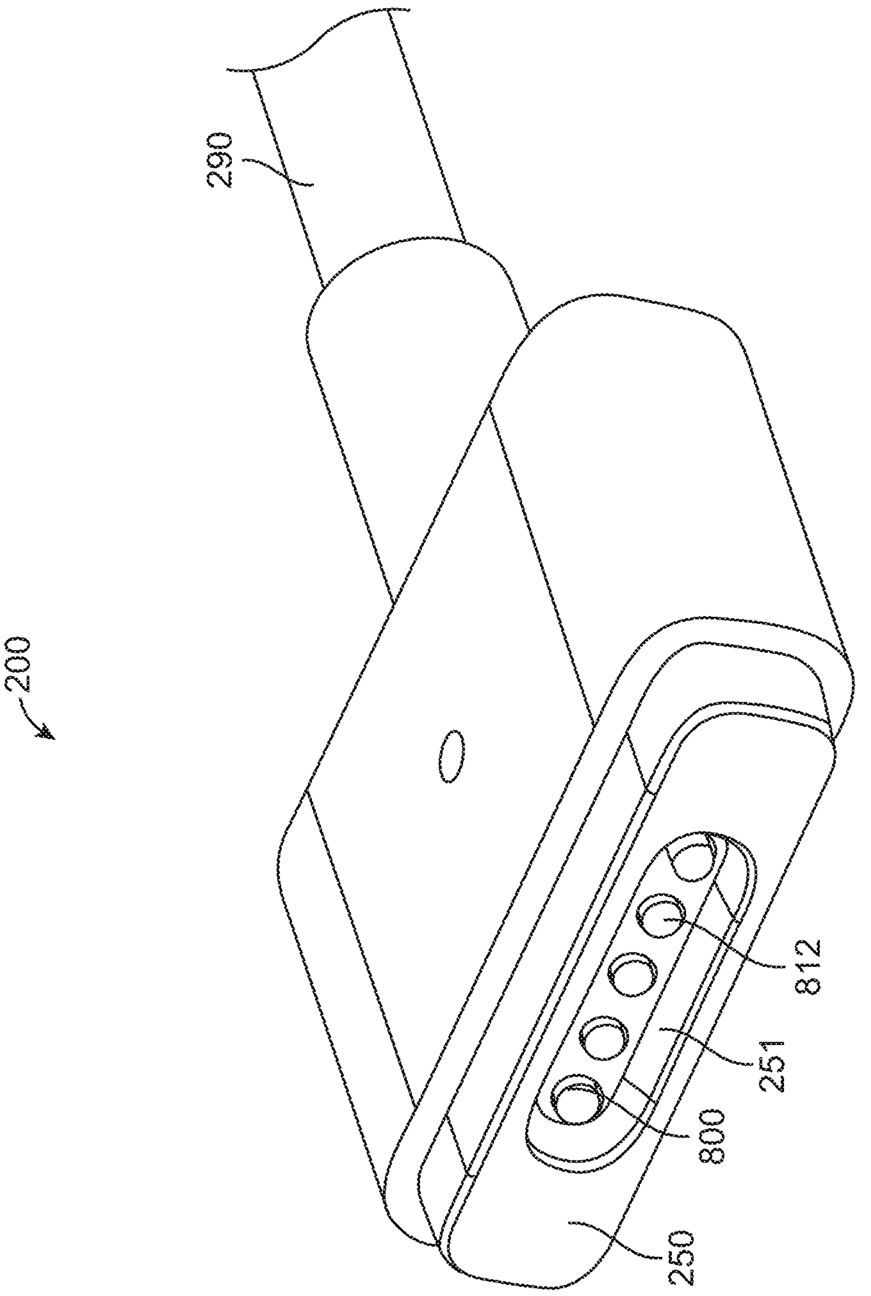
FIG. 8 illustrates a connector insert according to an embodiment of the present invention.

FIG. 8 illustrates a connector insert according to an embodiment of the present invention. Connector insert 200 can be arranged to mate with connector receptacle 100, as shown in FIG. 1. Connector insert 200 can be at a first end of cable 290. Connector insert 200 can include an attraction plate 250 that can be magnetically attracted to magnet array 150 (shown in FIG. 4.) Attraction plate 250 can include opening 251 for accepting mesa 112 (shown in FIG. 2) of connector receptacle 100. Attraction plate 250 can fit in recess 113 of connector receptacle 100 (both shown in FIG. 5.) Contacting surfaces 122 of contacts 120 (shown in FIG. 2) can form electrical connections at contacting surfaces 812 of spring-loaded contacts 800.

Figure 9:
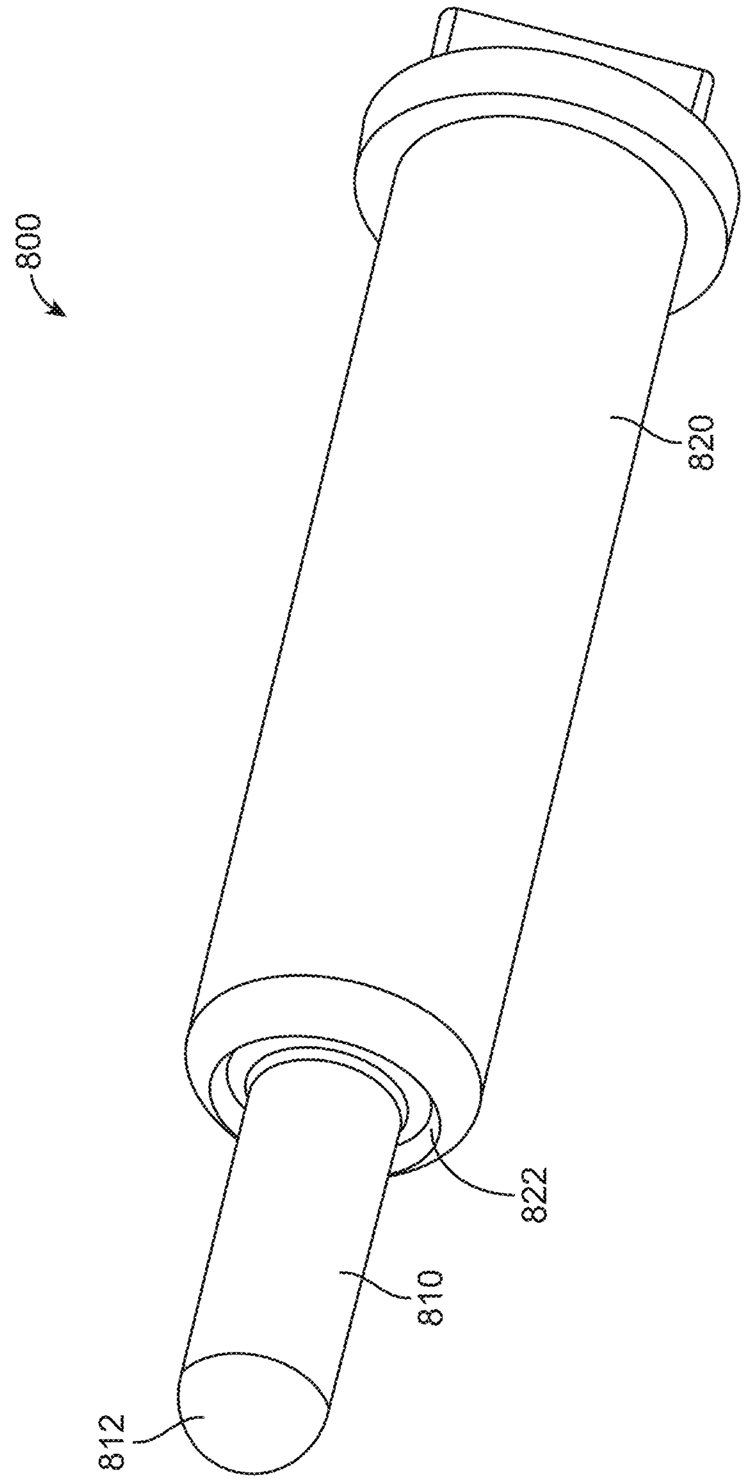
FIG. 9 illustrates a spring-loaded contact according to an embodiment of the present invention.

FIG. 9 illustrates a spring-loaded contact according to an embodiment of the present invention. Spring-loaded contact 800 can include plunger 810. Plunger 810 can include contacting surface 812. Plunger 810 can emerge from front opening 822 in barrel 820.

As contact is made between spring-loaded contact 800 and a corresponding contact, such as contacting surface 122 of contact 120 (shown in FIG. 4), the biased plunger 810 can be depressed. Spring 860 (shown in FIG. 10) in spring-loaded contact 800 can apply a force between plunger 810 and the corresponding contact thereby forming an electrical connection. Typically, current in the electrical connection can flow through the plunger and barrel 820. But in some configurations, as plunger 810 is depressed, contact between plunger 810 and the barrel 820 can be broken. In this circumstance, current can flow through spring 860. If spring-loaded contact 800 is a power supply contact, such as a contact providing a power supply voltage or ground, the current can damage or destroy spring 860 thereby rendering the contact inoperable.

Accordingly, an illustrative embodiment of the present invention can provide spring-biased contacts that include an intermediate object between plunger 810 and spring 860 or other biasing structure. Examples are shown in the following figures.

Figure 10:
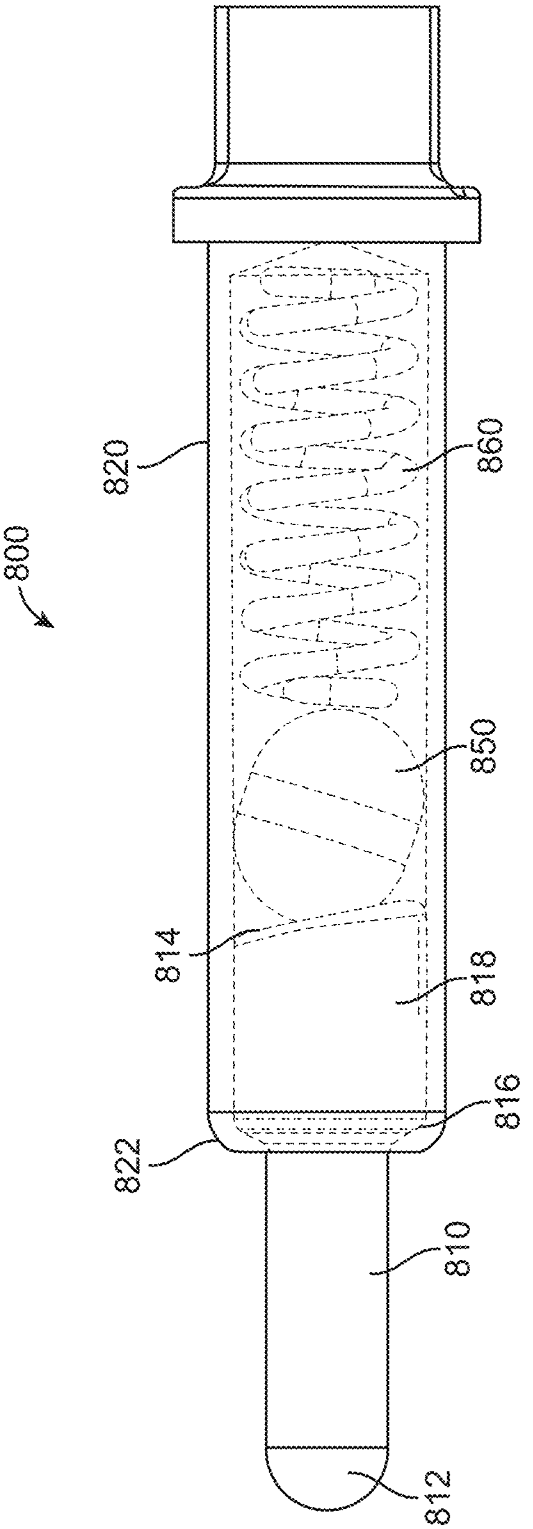
FIG. 10 illustrates a transparent side view of the spring-loaded contact of FIG. 9.

FIG. 10 illustrates a transparent side view of the spring-loaded contact of FIG. 9. Plunger 810 can include contacting surface 812. Plunger 810 can further include neck 816 leading to body 818. Body 818 can be retained inside barrel 820 by front opening 822. Plunger 810 can include backside 814. Backside 814 can contact intermediate object 850. Intermediate object 850 can be positioned between plunger 810 and spring 860. Spring 860 can act to push plunger 810 out of barrel 820 and can be compliant such that plunger 810 can be depressed into barrel 820 of spring-loaded contact 800 when mated with a corresponding contacting surface 122 (shown in FIG. 2.)

Figure 11:
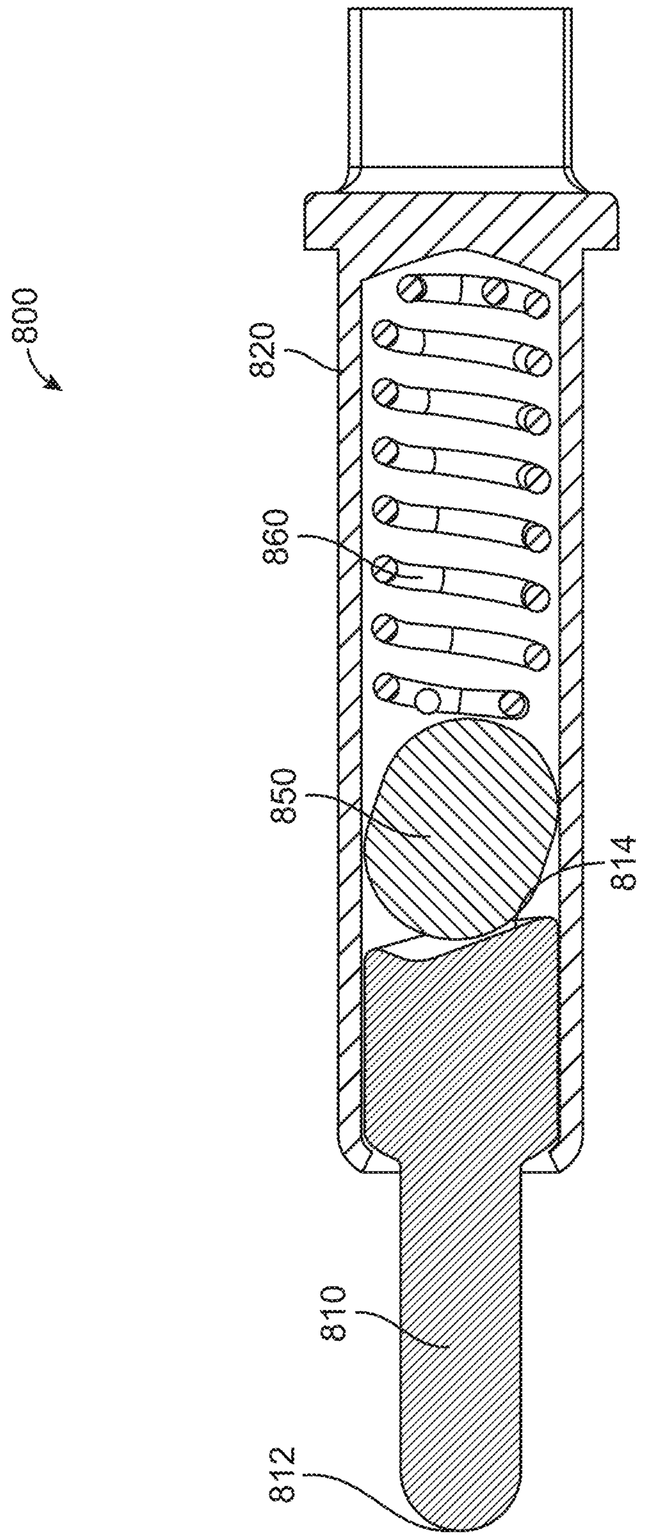
FIG. 11 illustrates a cutaway side view of the spring-loaded contact of FIG. 9.

FIG. 11 illustrates a cutaway side view of the spring-loaded contact of FIG. 9. Spring-loaded contact 800 can include intermediate object 850 in barrel 820. Intermediate object 850 can be positioned between plunger 810 and spring 860. Intermediate object 850 can contact backside 814 of plunger 810. Plunger 810 can further have tip or contacting surface 812. Spring 860 can push intermediate object 850 against backside 814 of plunger 810.

Figure 12:
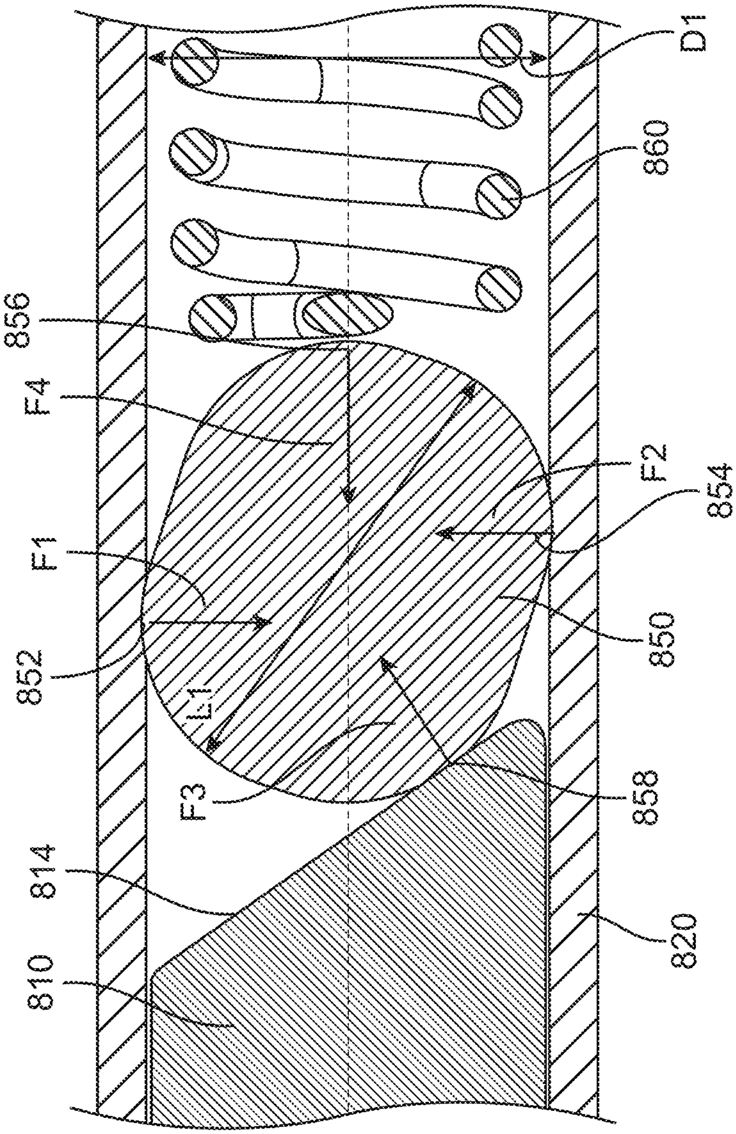
FIG. 12 is a more detailed view of an intermediate object that can be used in the spring-loaded contact of FIG. 9.

FIG. 12 is a more detailed view of an intermediate object that can be used in the spring-loaded contact of FIG. 9. Intermediate object 850 can be positioned between plunger 810 and spring 860. Intermediate object 850 can encounter backside 814 of plunger 810 as well as spring 860. Intermediate object 850 can provide multiple paths for currents in spring-loaded contact 800. For example, current can flow though plunger 810 into intermediate object 850 and through first location 852 to barrel 820. Current can also flow though plunger 810 into intermediate object 850 and through second location 854 to barrel 820. These current paths can help to limit current through spring 860. The currents in barrel 820 can then flow through other conduits that are connected to barrel 820, such as wires, board traces, or others (not shown.)

Intermediate object 850 can have a first length L1 that is greater than an inner diameter D1 of barrel 820. Intermediate object 850 can be between a backside 814 of plunger 810 and spring 860, where intermediate object 850 simultaneously contacts an inside surface of barrel at first location 852 and second location 854. First location 852 and second location 854 can be on opposite sides of intermediate object 850. First location 852 can be a first distance (not shown) from front opening 822 of barrel 820 and second location 854 can be a second distance (not shown) from front opening 822, the first distance different than the second distance.

In these and other embodiments of the present invention, an inside surface of barrel 820 can provide a first force along a first force vector F1 against intermediate object 850 at first location 852. The inside surface of barrel 820 can provide a second force along a second force vector F2 against intermediate object 850 at second location 854. The first force vector F1 and the second force vector F2 can be parallel and non-overlapping. Backside 814 of plunger 810 can provide third force vector F3 to intermediate object 850 at location 858. Spring 860 can provide fourth force vector F4 to intermediate object 850 at location 856.

Figure 13A:
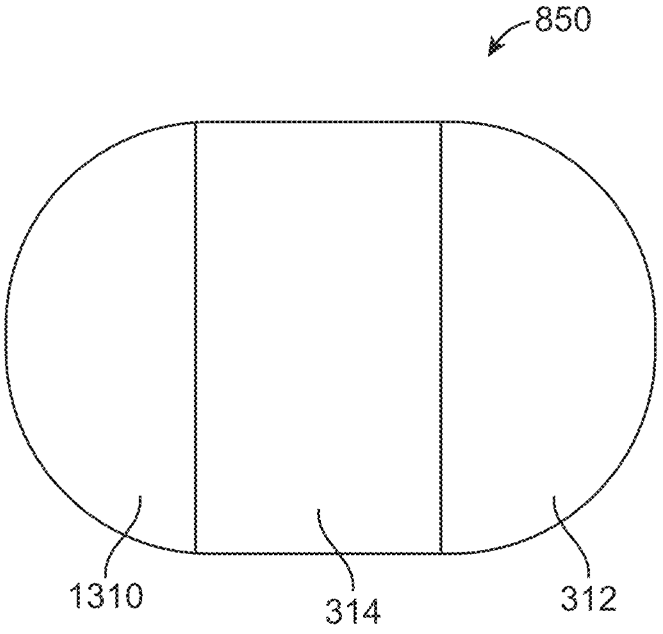
FIG. 13A and FIG. 13B illustrate an intermediate object according to an embodiment of the present invention.
Figure 13B:
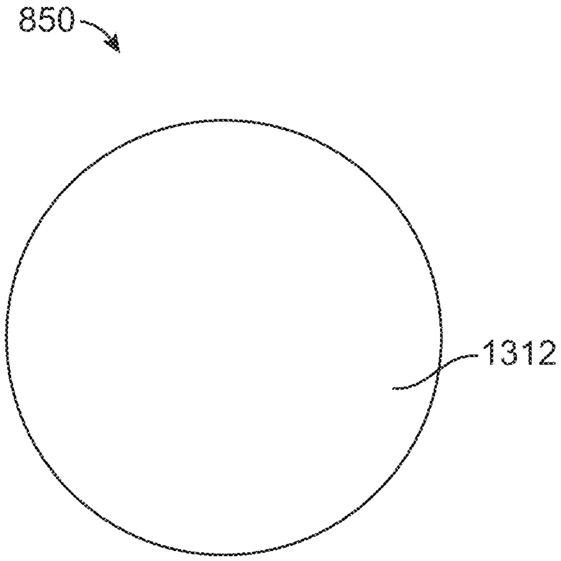

FIG. 13 illustrates an intermediate object according to an embodiment of the present invention. Intermediate object 850 can have various shapes. For example, intermediate object 850 can have a capsule shape. Intermediate object 850 can have a stadium-of-rotation shape. Intermediate object 850 can have a spherocylinder shape. Intermediate object 850 can have a shape defined by two hemispheres 1310 and 1312 separated by cylinder 1314.

Figure 14:
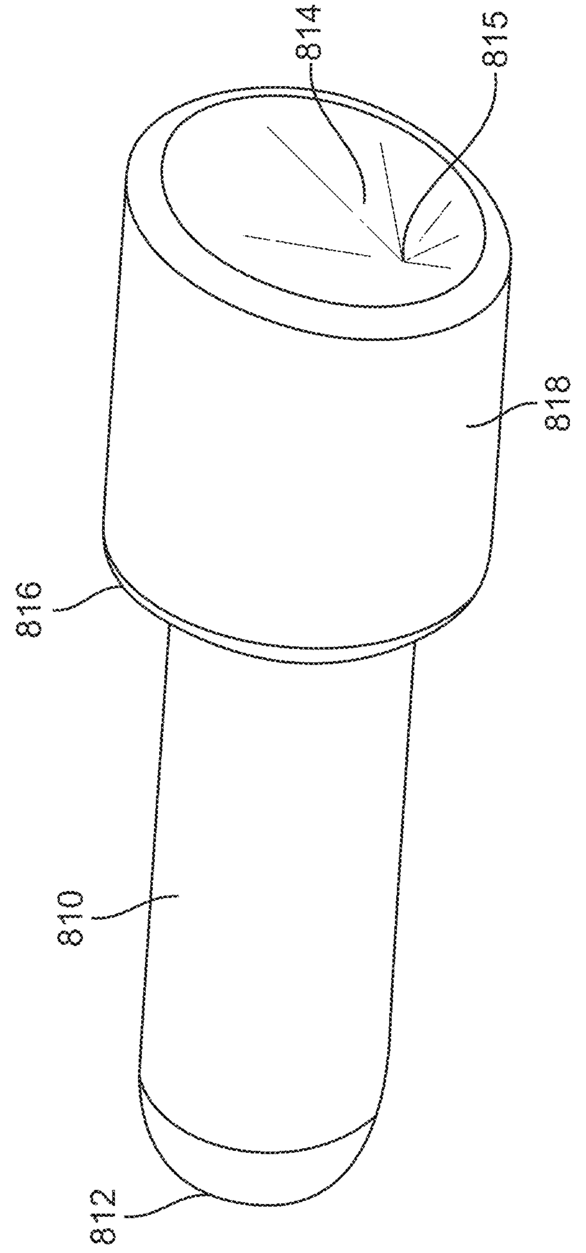
FIG. 14 is a more detailed view of a plunger for the spring-loaded contact of FIG. 9.

FIG. 14 is a more detailed view of a plunger for the spring-loaded contact of FIG. 9. Plunger 810 can include contacting surface 812. Plunger 810 can further include neck 816 leading to body 818. Plunger 810 can include backside 814. Backside 814 can be sloped. Backside 814 can have a conical indentation. Backside 814 can have a conical surface. Backside 814 can have an off-center conical surface. Backside 814 can have a sloped off-center conical surface. The conical indention can have an apex at point 815. Plunger 810 can be used as the other plungers shown herein or otherwise provided by embodiments of the present invention.

Figure 15:
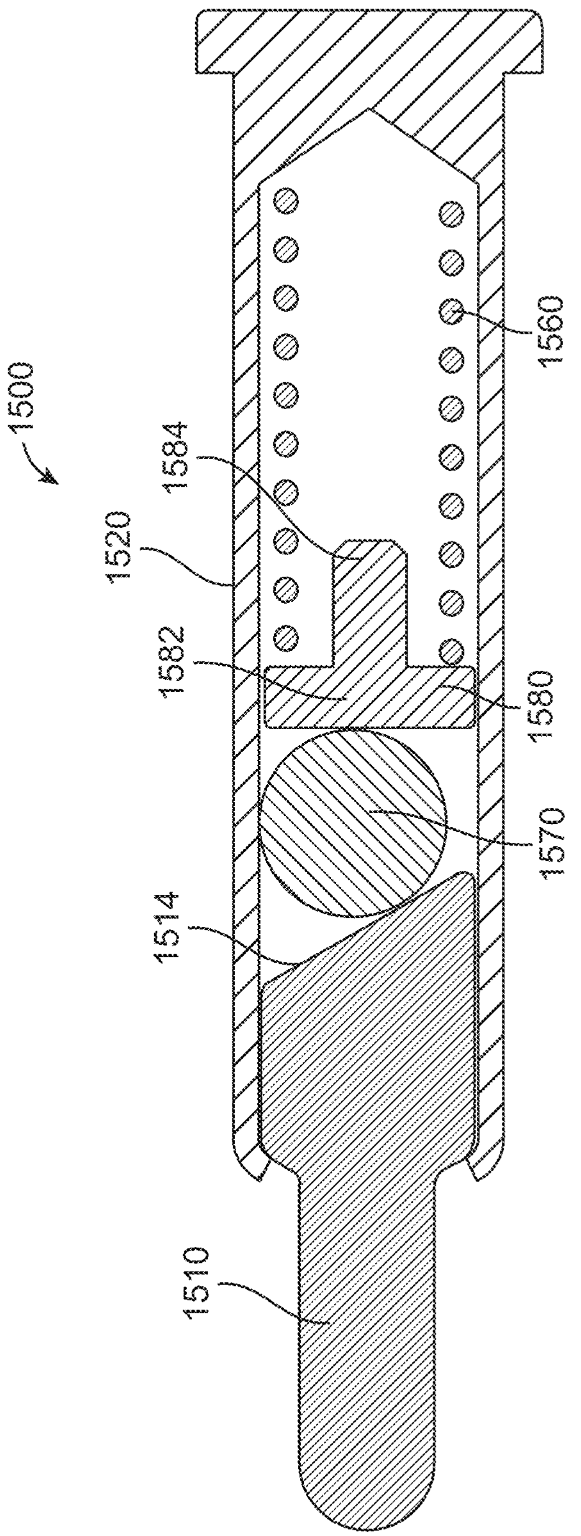
FIG. 15 illustrates another spring-loaded contact according to an embodiment of the present invention.

FIG. 15 illustrates another spring-loaded contact according to an embodiment of the present invention. Spring-loaded contact 1500 can be used as spring-loaded contact 800 (shown in FIG. 8.) Spring-loaded contact 1500 can include plunger 1510, intermediate object 1570, piston 1580, and spring 1560. At least a portion of plunger 1510, intermediate object 1570, piston 1580, and spring 1560 can be housed in barrel 1520. Piston 1580 can include head 1582 and tail 1584. Some of spring 1560 can encircle tail 1584 of piston 1580, thereby keeping piston 1580 aligned to spring 1560. Spring 1560 can apply force against head 1582 of piston 1580, thereby pushing head 1582 of piston 1580 into intermediate object 1570. Intermediate object 1570 can push against a backside 1514 of piston 1580. As spring-loaded contact 1500 engages a corresponding contact, such as contacting surface 122 of contacts 120 (shown in FIG. 4), plunger 1510 can be depressed into barrel 1520. This can compress spring 1560. In this way, spring 1560 can continue to apply a force pushing plunger 1510 against contacting surface 122 when the contacts are mated.

Figure 16:
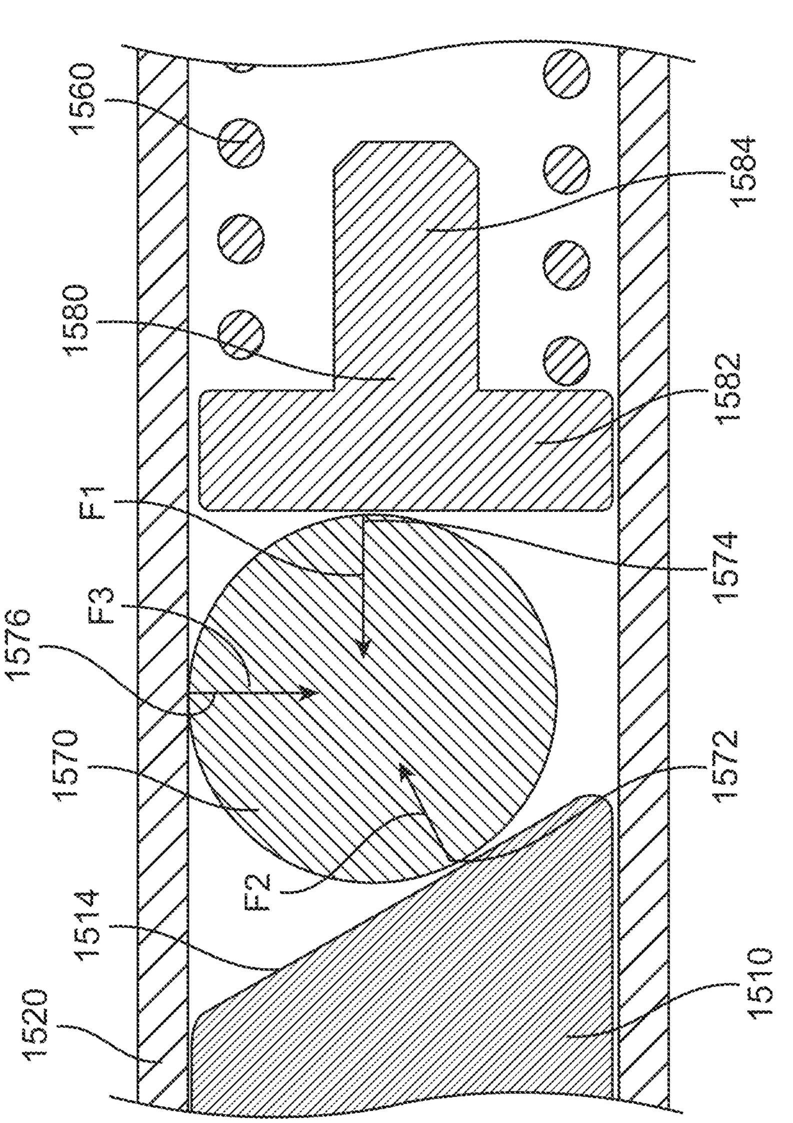
FIG. 16 is a more detailed view of the spring-loaded contact of FIG. 15.

FIG. 16 illustrates a close-up view of a portion of the spring-loaded contact FIG. 15. Spring 1560 can push against head 1582 of piston 1580. Some of spring 1560 can encircle tail 1584 of piston 1580. Spring 1560 can provide force F1 at location 1574 to intermediate object 1570 through head 1582 of piston 1580. This force can be resisted by force F2 applied to location 1572 of intermediate object 1570 by backside 1514 of plunger 1510. These forces can push intermediate object 1570 into barrel 1520 at location 1576 with force F3.

In these and other embodiments of the present invention, intermediate object 1570 can be formed of a conductive material, while piston 1580 can be formed of a nonconductive or insulating material. This arrangement can provide current flow through spring-loaded contact 1500 while protecting spring 1560 from excessive currents. Plunger 1510 can contact intermediate object 1570 at location 1572. Currents can flow through this location through intermediate object 1570 and to barrel 1520 at location 1576. When piston 1580 is nonconductive, current does not flow through intermediate object 1570 to piston 1580 via location 1574. This can protect spring 1560 from seeing excessive current. When piston 1580 is conductive, currents can flow through intermediate object 1570 to piston 1580 via location 1574. Piston 1580 can be can then contact inside surface of barrel 1520 providing and other current path to protect spring 1560.

Figure 17:
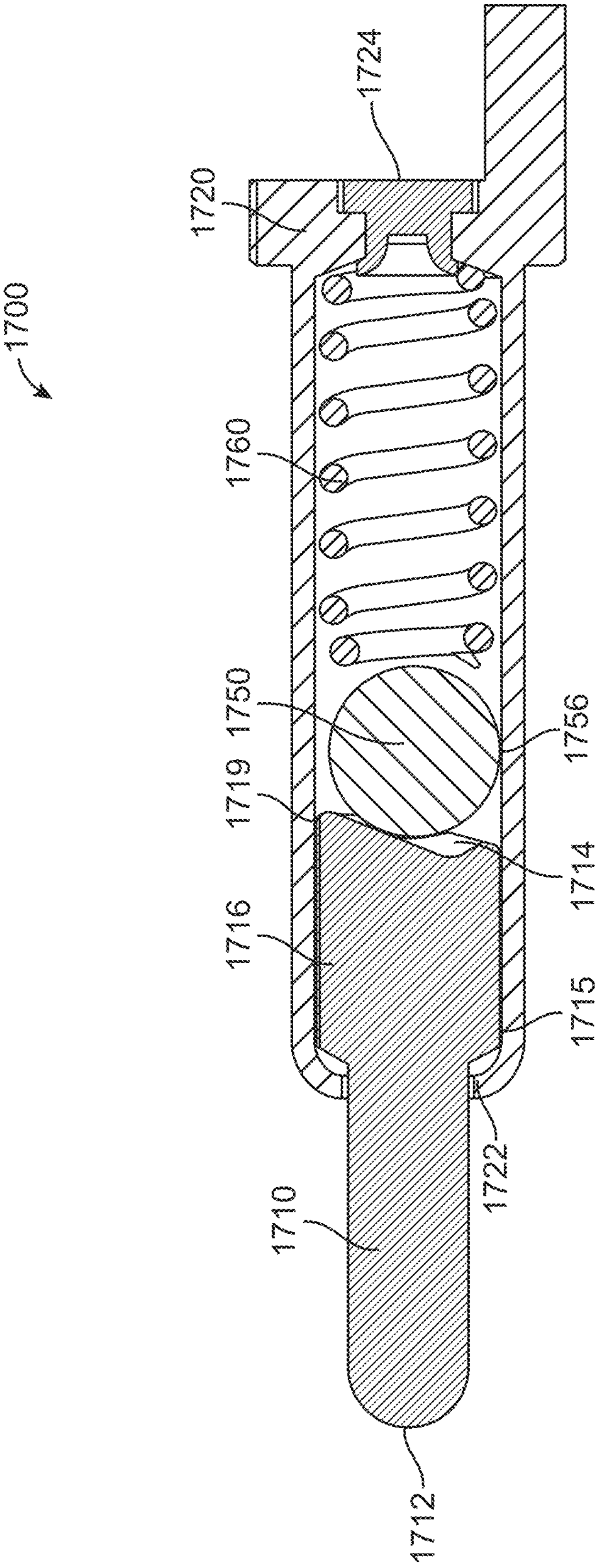
FIG. 17 illustrates another spring-loaded contact according to an embodiment of the present invention.

FIG. 17 illustrates another spring-loaded contact according to an embodiment of the present invention. Spring-loaded contact 1700 can be used as spring-loaded contact 800 (shown in FIG. 8.) Spring-loaded contact 1700 can include plunger 1710, intermediate object 1750, and spring 1760. At least portion 1716 of plunger 1710, intermediate object 1750, and spring 1760 can be housed in barrel 1720. Tip 1712 of plunger 1710 can extend beyond opening 1722 of barrel 1720. An end of barrel 1720 can be sealed by seal 1724. Spring 1760 can apply force against intermediate object 1750, thereby pushing intermediate object 1750 against a backside 1714 of plunger 1710. As spring-loaded contact 1700 engages a corresponding contact, such as contacting surface 122 of contacts 120 (shown in FIG. 4), plunger 1710 can be depressed into barrel 1720. This can compress spring 1760. In this way, spring 1760 can continue to apply a force pushing tip 1712 of plunger 1510 against contacting surface 122 when the contacts are mated.

In these and other embodiments of the present invention, intermediate object 1750 can be formed of a conductive material. When spring-loaded contact 1700 is mated with a corresponding contact, plunger 1710 can contact intermediate object 1750 at its backside 1714. Current can flow through plunger 1710 and through this location to intermediate object 1750 and then to barrel 1720 at location 1756. Plunger 1710 can tilt in barrel 1720 making contact with barrel 1720 at location 1715 and location 1719. As a result, current can also flow through plunger 1710 to barrel 1720 at location 1715 and location 1719.

In these and other embodiments of the present invention, backside 1714 of plunger 1710, and the other backsides of the other plungers shown here, can have various contours. For example, they can be flat, sloped, or otherwise curved, they can be conical or have conical indentations or other non-uniform surfaces. Backside 1714 of plunger 1710 can have an off-center conical surface. The backside of the plunger can have a sloped off-center conical surface.

Figure 18A:
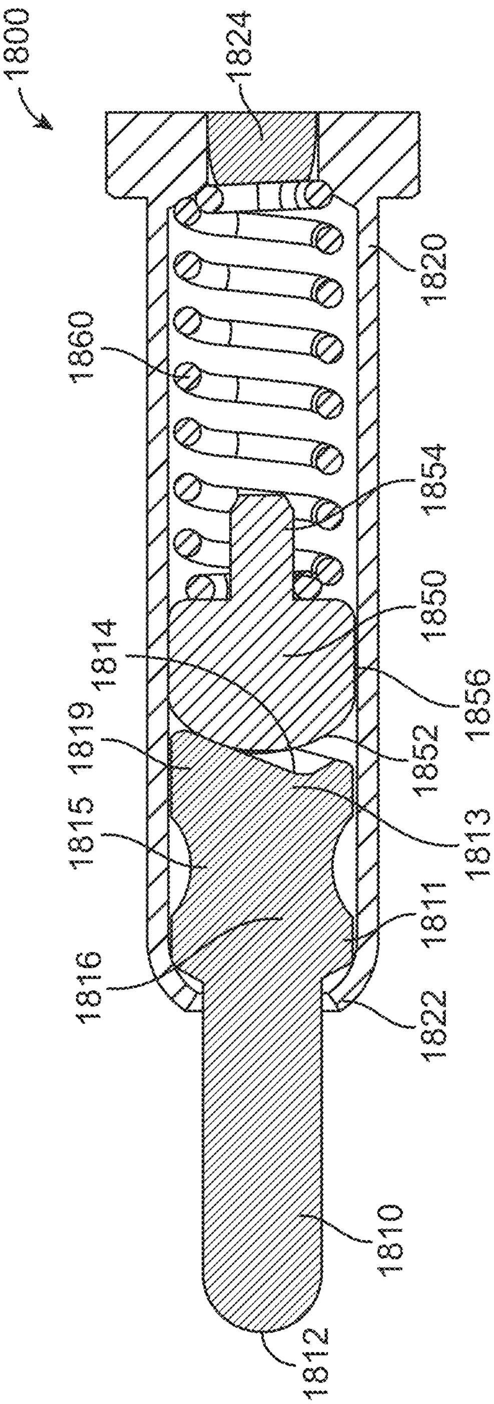
FIG. 18A and FIG. 18B illustrate another spring-loaded contact according to an embodiment of the present invention.
Figure 18B:
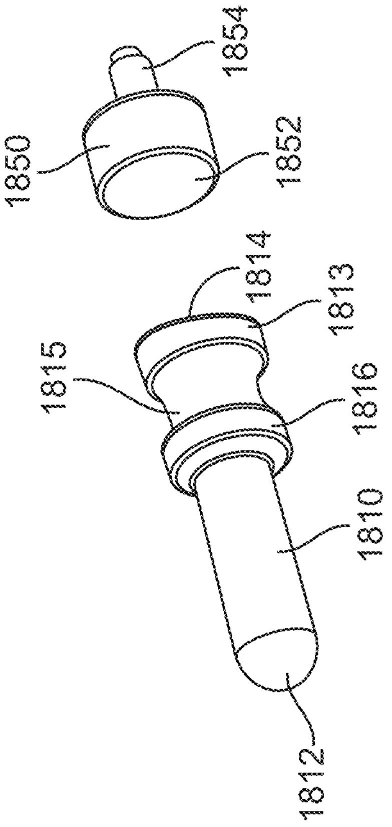

FIG. 18A and FIG. 18B illustrate another spring-loaded contact according to an embodiment of the present invention. Spring-loaded contact 1800 can be used as spring-loaded contact 800 (shown in FIG. 8.) Spring-loaded contact 1800 can include plunger 1810, piston 1850, and spring 1860. At least some of plunger 1810 including wide portion 1816, narrow portion 1815, and wide portion 1813, piston 1850, and spring 1860 can be housed in barrel 1820. Tip 1812 of plunger 1810 can extend through opening 1822 of barrel 1820. Plunger 1810 can include narrow portion 1815 between wide portion 1813 and wide portion 1816. Barrel 1820 can be sealed with seal 1824. Piston 1850 can include head 1852 and tail 1854. Some of spring 1860 can encircle tail 1854 of piston 1850, thereby keeping piston 1850 aligned to spring 1860. Spring 1860 can apply force against head 1852 of piston 1850, thereby pushing head 1852 of piston 1850 into backside 1814 of plunger 1810. As spring-loaded contact 1800 engages a corresponding contact, such as contacting surface 122 of contacts 120 (shown in FIG. 4), plunger 1810 can be depressed into barrel 1820. This can compress spring 1860. In this way, spring 1860 can continue to apply a force pushing tip 1812 of plunger 1810 against contacting surface 122 when the contacts are mated.

In these and other embodiments of the present invention, piston 1850 can be formed of a conductive material. When spring-loaded contact 1800 is mated with a corresponding contact, plunger 1810 can contact piston 1850 at its backside 1814. Current can flow through plunger 1810 and through this location to piston 1850 and to barrel 1820 at location 1856. Plunger 1810 can tilt in barrel 1820 making contact with barrel 1820 at location 1811 of wide portion 1816 and location 1819 of wide portion 1813. As a result, current can also flow through plunger 1810 to barrel 1820 at location 1811 and location 1819. The inclusion of wide portion 1816 and wide portion 1813 can help to improve the connection between plunger 1810 and barrel 1820, thereby reducing an impedance of spring-loaded contact 1800.

In these and other embodiments of the present invention, backside 1814 of plunger 1810, and the other backsides of the other plungers shown here, can have various contours. For example, they can be flat, sloped, or otherwise curved, they can be conical or have conical indentations or other non-uniform surfaces. Backside 1814 of plunger 1810 can have an off-center conical surface. The backside of the plunger can have a sloped off-center conical surface.

Figure 19:
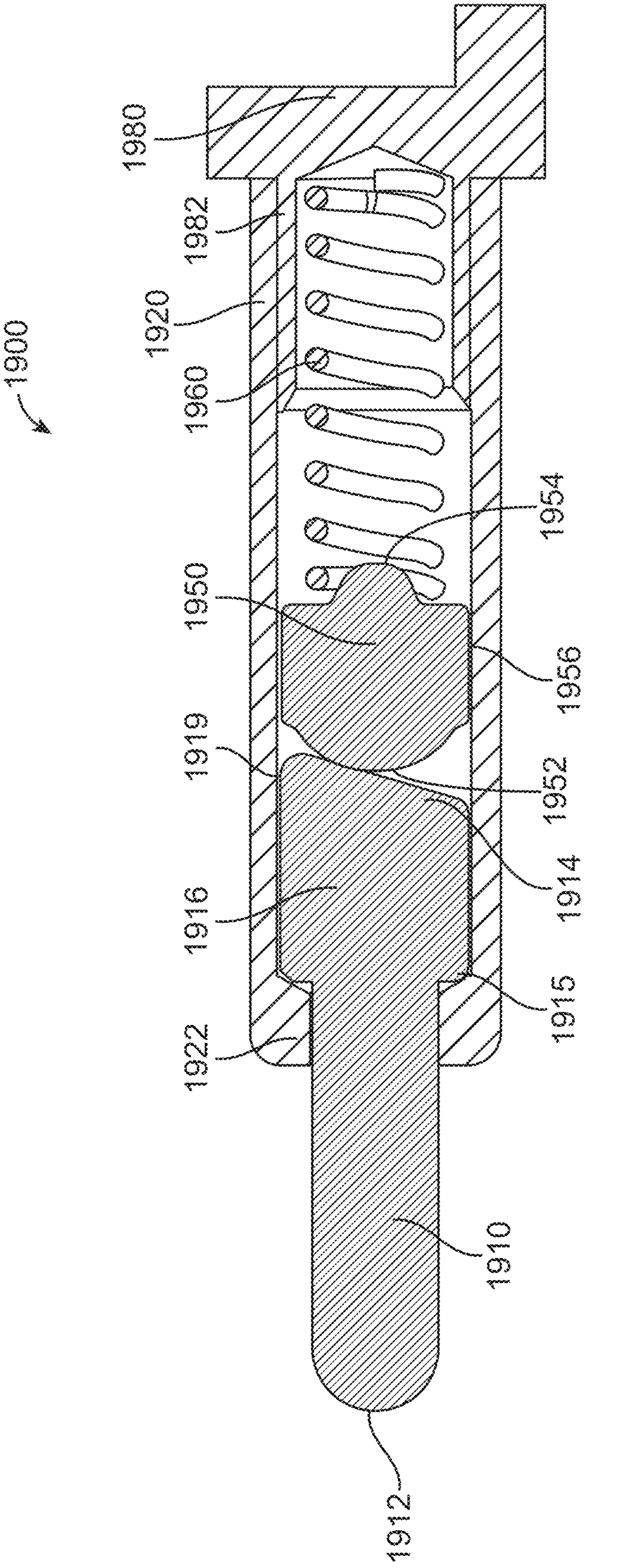
FIG. 19 illustrates another spring-loaded contact according to an embodiment of the present invention.

FIG. 19 illustrates another spring-loaded contact according to an embodiment of the present invention. Spring-loaded contact 1900 can be used as spring-loaded contact 800 (shown in FIG. 8.) Spring-loaded contact 1900 can include plunger 1910, piston 1950, and spring 1960. At least a portion 1916 of plunger 1910, piston 1950, and spring 1960 can be housed in barrel 1920. Tip 1912 of plunger 1910 can extend through opening 1922 of barrel 1920. Barrel 1920 can be sealed by back portion 1980. Back portion 1980 can include sleeve 1982 that can fit in barrel 1920. Piston 1950 can include head 1952 and tail 1954. Some of spring 1960 can encircle tail 1954 of piston 1950, thereby keeping piston 1950 aligned to spring 1960. Spring 1960 can apply force against piston 1950, thereby pushing head 1952 of piston 1950 into backside 1914 of plunger 1910. As spring-loaded contact 1900 engages a corresponding contact, such as contacting surface 122 of contacts 120 (shown in FIG. 4), plunger 1910 can be depressed into barrel 1920. This can compress spring 1960. In this way, spring 1960 can continue to apply a force pushing tip 1912 of plunger 1910 against contacting surface 122 when the contacts are mated.

In these and other embodiments of the present invention, piston 1950 can be formed of a conductive material. When spring-loaded contact 1900 is mated with a corresponding contact, plunger 1910 can contact piston 1950 at its backside 1914. Current can flow through plunger 1910 and through this location to piston 1950 and to barrel 1920 at location

1956. Plunger 1910 can tilt in barrel 1920 making contact with barrel 1920 at location 1915 and location 1919 of portion 1916 of plunger 1910. As a result, current can also flow through plunger 1910 to barrel 1920 at location 1911 and location 1919.

In these and other embodiments of the present invention, backside 1914 of plunger 1910, and the other backsides of the other plungers shown here, can have various contours. For example, they can be flat, sloped, or otherwise curved, they can be conical or have conical indentations or other non-uniform surfaces. Backside 1914 of plunger 1910 can have an off-center conical surface. The backside of the plunger can have a sloped off-center conical surface.

While piston 1950 can be conductive, it can still be desirable to protect spring 1960 from current. Accordingly, a portion of piston 1950 can be insulated or nonconductive. An example is shown in the following figure.

Figure 20:
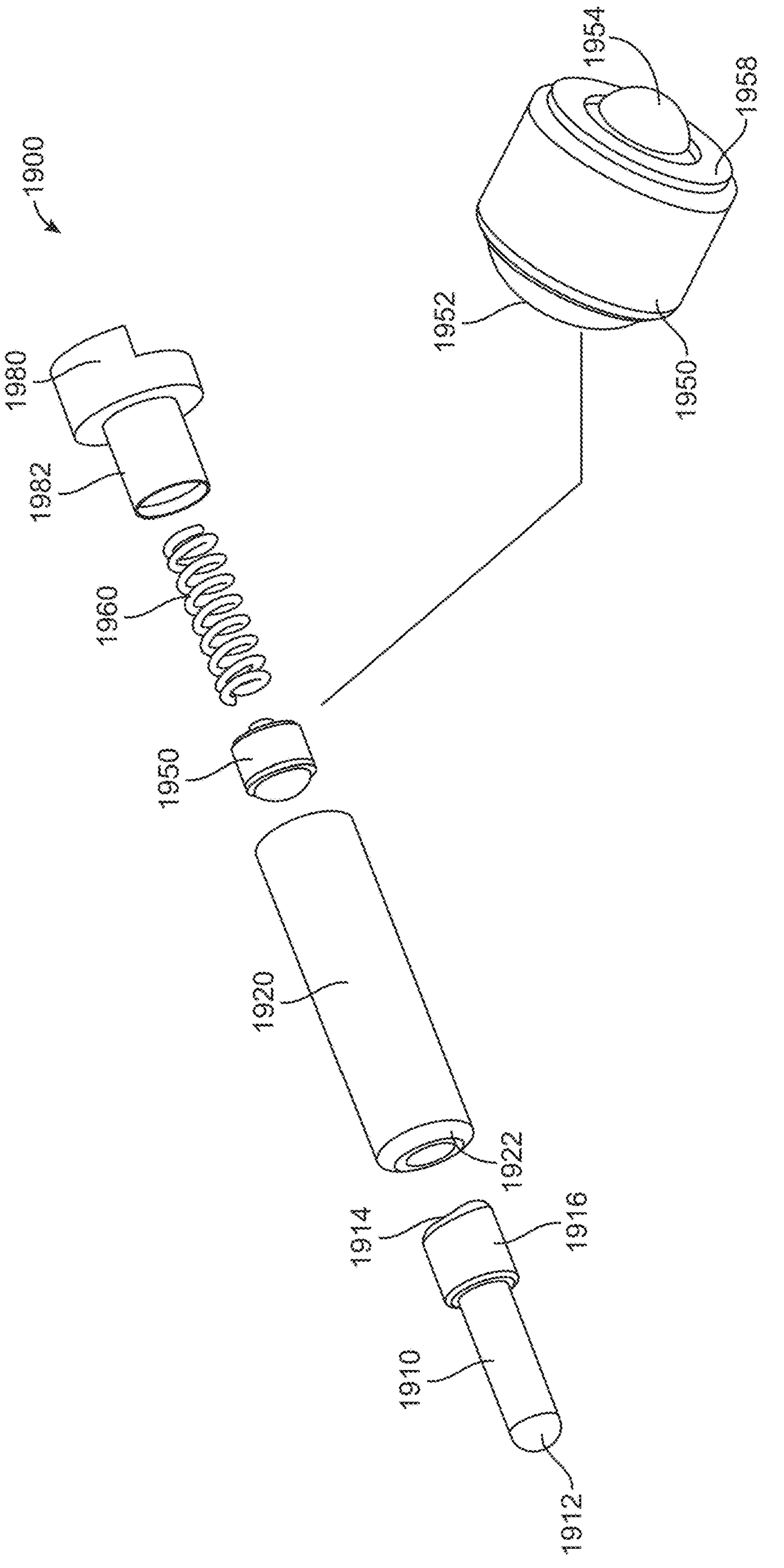
FIG. 20 is an exploded view of the spring-loaded contact of FIG. 19.

FIG. 20 is an exploded view of the spring-loaded contact of FIG. 19. Spring-loaded contact 1900 can include plunger 1910. Plunger 1910 can include tip 1912, which can extend through opening 1922 of barrel 1920 and portion 1916, which can be housed in barrel 1920. Barrel 1920 can be sealed by back portion 1980. Back portion 1980 can include sleeve 1982, which can be fit inside barrel 1920 and can be fixed in place, for example by soldering or laser or spot-welding. Barrel can house piston 1950. Piston 1950 can include head 1952 that can contact backside 1914 of plunger 1910. Piston 1950 can include tail 1954, which can be partially encircled by spring 1960. Spring 1960 can bias piston 1950 and plunger 1910.

Insulating piece 1958 can help to prevent piston 1950 from electrically contacting spring 1960, thereby protecting spring 1960. Insulating piece 1958 can be tape, molded plastic, or other insulating material. Insulating piece 1958 can be die cut, molded, or formed in other ways.

Connector receptacle 100 (shown in FIG. 4) can be employed in a side surface of electronic device 300 (shown in FIG. 1.) When electronic device 300 is thin or has a low-z height (that is, it has a low profile), it can be difficult for connector receptacle 100 to provide enough magnetic hold force to secure connector insert 200 (shown in FIG. 8) in place. Accordingly, these and other embodiments of the present invention can provide a connector system having an improved magnetic circuit. This magnetic circuit can provide a magnet array arranged to provide a strong attachment that allows the use of a low-profile connector receptacle and connector insert. The magnet array can include magnets and magnetic elements, where the magnetic elements can be magnetically conductive pole pieces and the magnets can be permanent magnets. Each pole piece can have magnets at two of its sides. The magnets can be arranged in an alternating manner such that the field lines guided by the pole pieces provide a strong magnetic attachment to a magnetically conductive attraction plate of a connector insert at a connecting face. The magnetic circuit can further include an attraction plate arranged to be attracted to the connecting face of the magnet array and to fit in a connector housing the magnet array. Examples are shown in the following figures.

Figure 21:
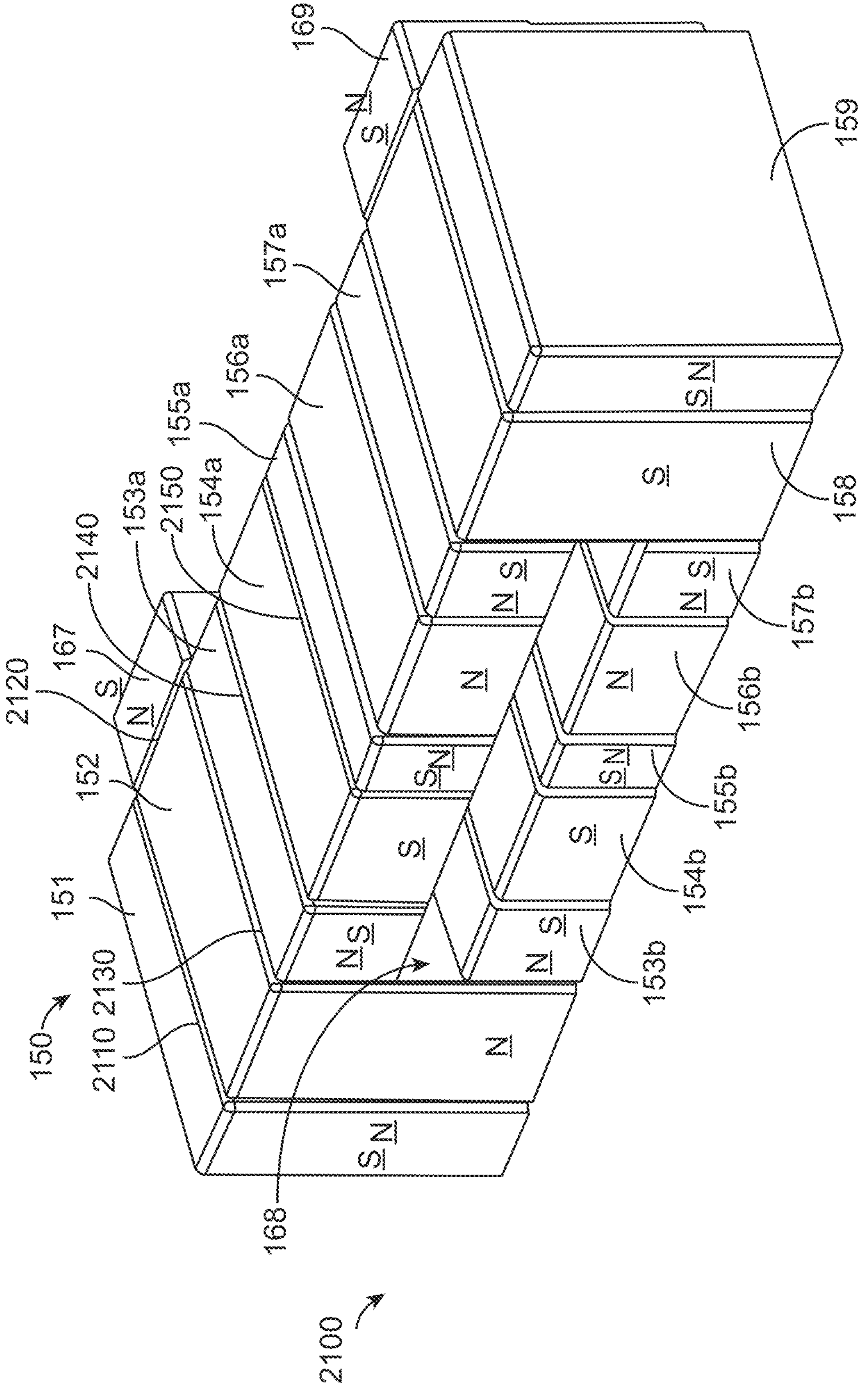
FIG. 21 illustrates a magnet array according to an embodiment of the present invention.

FIG. 21 illustrates a magnet array according to an embodiment of the present invention. Magnet array 150 can be positioned around contact housing 110 (shown in FIG. 4.) Magnet array 150 can have connecting face 2100 adjacent to faceplate 180 (shown in FIG. 4.) Contact housing 110 can pass through opening 168 in magnet array 150. Magnet array 150 can include pole piece 152, pole piece **154*a*, pole piece 154*b*, pole piece 156*a*, pole piece 156*b*, and pole piece 158. Magnet array 150 can include magnet 151, magnet 153*a*, magnet 153*b*, magnet 155*a*, magnet 155*b*, magnet 157*a*, magnet 157*b*, and magnet 159. Additional magnets including additional magnet 167 and additional magnet 169** can also be included.

Each pole piece can be abutted by two or more magnets. In general, each pole piece can have magnets at two or more surfaces. Each pole piece can direct or guide the magnetic field provided by poles of two or more magnets at its surfaces. A pole piece can have two or more magnets oriented with their north poles at surfaces of the pole piece and their south poles away from the surfaces of the pole piece, and the pole piece can direct the magnetic field from the magnet's north poles to connecting face 2100 of magnet array 150. Another pole piece can have magnets oriented with their south poles at surfaces of the pole piece and their north poles away from the surfaces of the pole piece, and the pole piece can direct the magnetic field to the magnet's south poles from connecting face 2100 of magnet array 150. For example, pole piece 152 can be abutted by a north pole of magnet 151, a north pole of magnet **153*a*, and a north pole of magnet 153*b*. Pole piece 152 can guide magnetic field lines from the north pole of magnet 151, the north pole of magnet 153*a*, and the north pole of magnet 153*b* to connecting face 2100. (Pole piece 152 can be labeled “N” in this figure to indicate that magnetic field lines are directed from north poles of magnet 151, magnet 153a, and magnet 153*b* to connecting face 2100. It should be noted that pole piece 152, and the other pole pieces, are magnetically soft and do not have an intrinsic polarity.) Accordingly, magnet 151, magnet 153*a*, and magnet 153*b* can have their north pole adjacent to pole piece 152 and their south pole away from pole piece 152. More specifically, pole piece 152 can have the north pole of magnet 151 at first surface 2110, and the north poles of magnet 153*a* and magnet 153*b* at second surface 2130, where first surface 2110 and second surface 2130 are opposing surfaces. Pole piece 152 can further have additional magnet 167 at third surface 2120, where third surface 2120 is adjacent to first surface 2110 and adjacent to second surface 2130. Additional magnet 167 can have its north pole adjacent to third surface 2120**.

Pole piece **154*a* can have a south pole of magnet 153*a* at fourth surface 2140 and a south pole of magnet 155*a* at fifth surface 2150, where fourth surface 2140 and fifth surface 2150 are opposing surfaces. (Pole piece 154*a* can be labeled “S” in this figure to indicate that magnetic field lines are directed to south poles of magnet 153*a* and magnet 153*b* from connecting face 2100.) Similarly, pole piece 154*b* can have a south pole of magnet 153*b* and a south pole of magnet 155*b* at opposing surfaces. Pole piece 156*a* can have a north pole of magnet 155*a* and a north pole of magnet 157*a* at opposing surfaces. Pole piece 156*b* can have a north pole of magnet 155*b* and a north pole of magnet 157*b* at opposing surfaces. Pole piece 158 can have a south pole of magnet 157*a* and a south pole of magnet 157*b* at a surface that opposes a surface adjacent to a south pole of magnet 159**.

Alternatively, pole piece 152 can have a south pole of magnet 151 at first surface 2110 and a south pole of magnet **153*a* and a south pole of magnet 153*b* at second surface 2130, where first surface 2110 and second surface 2130 are opposing surfaces. Pole piece 152 can also have a south pole of additional magnet 167 at third surface 2120, where third surface 2120 is adjacent to first surface 2110 and adjacent to second surface 2130. Pole piece 154*a* can have a north pole of magnet 153*a* at fourth surface 2140 and a north pole of magnet 155*a* at fifth surface 2150, where fourth surface 2140 and fifth surface 2150 are opposing surfaces. Similarly, pole piece 154*b* can have a north pole of magnet 153*b* and a north pole of magnet 155***b* at opposing surfaces. Pole piece 156*a* can have a south pole of magnet 155*a* and a south pole of magnet 157*a* at opposing surfaces. Pole piece 156*b* can have a south pole of magnet 155*b* and a south pole of magnet 157*b* at opposing surfaces. Pole piece 158 can have a north pole of magnet 157*a* and a north pole of magnet 157*b* at a surface that opposes a surface adjacent to a north pole of magnet 159.

Pole piece 152, pole piece 154*a*, pole piece 154*b*, pole piece 156*a*, pole piece 156*b*, and pole piece 158 can guide field lines having alternating polarities. For example, pole piece 152, pole piece 156*a*, and pole piece 156*b* can guide field lines of a first polarity, while pole piece 154*a*, pole piece 154*b*, and pole piece 158 can guide field lines of a second polarity. That is, pole piece 152 can guide field lines from north poles of magnet 151, magnet 153*a*, and magnet 153*b*, pole piece 154*a* can guide field lines to south poles of magnet 153*a* and magnet 155*a*, pole piece 154*b* can guide field lines to south poles of magnet 153*b* and magnet 155*b*, pole piece 156*a* can guide field lines from north poles of magnet 155*a* and magnet 157*a*, pole piece 156*b* can guide field lines from north poles of magnet 155*b* and magnet 157*b*, and pole piece 158 can guide field lines to south poles of magnet 157*a*, magnet 157*b*, and magnet 159. Additional magnet 167 and additional magnet 169 can be included. For example, additional magnet 167 can be adjacent to pole piece 152. In the example where magnet 151, magnet 153*a*, and magnet 153*b* have their north poles adjacent to pole piece 152, additional magnet 167 can also have its north pole adjacent to pole piece 152 while the south pole of additional magnet 167 can face away from pole piece 152. Additional magnet 169 can have its south pole adjacent to pole piece 158, while its north pole faces away from pole piece 158. Additional magnet 167 and additional magnet 169 can further increase a magnetic field at connecting face 2100.

Each pole piece, such as pole piece 152, pole piece 154*a*, pole piece 154*b*, pole piece 156*a*, pole piece 156*b*, and pole piece 158, as well as magnetic element 2210 and magnetic element 2212 (both shown in FIG. 22) and faceplate 180 (shown in FIG. 4) can be formed of a magnetically conductive material, for example a soft magnetic alloy or other magnetically conductive material, such as martensitic stainless steel, ferritic stainless steel, low-carbon steel, iron-cobalt, an iron-silicon or nickel-iron alloy, or other ferro-magnetic material, or other type of material. Each magnet, such as magnet 151, magnet 153*a*, magnet 153*b*, magnet 155*a*, magnet 155*b*, magnet 157*a*, magnet 157*b*, and magnet 159, as well as additional magnets including additional magnet 167, additional magnet 169, additional magnet 2240*a*, and additional magnet 2242*a* (both shown in FIG. 22), as well as additional magnet 2240*b* and additional magnet 2242*b* (not shown) can be a permanent magnet formed of recycled rare-earth magnets, or other rare-earth or other ferro-magnetic material, such as neodymium, neodymium iron boron or nickel-cobalt, or other material.

Figure 22:
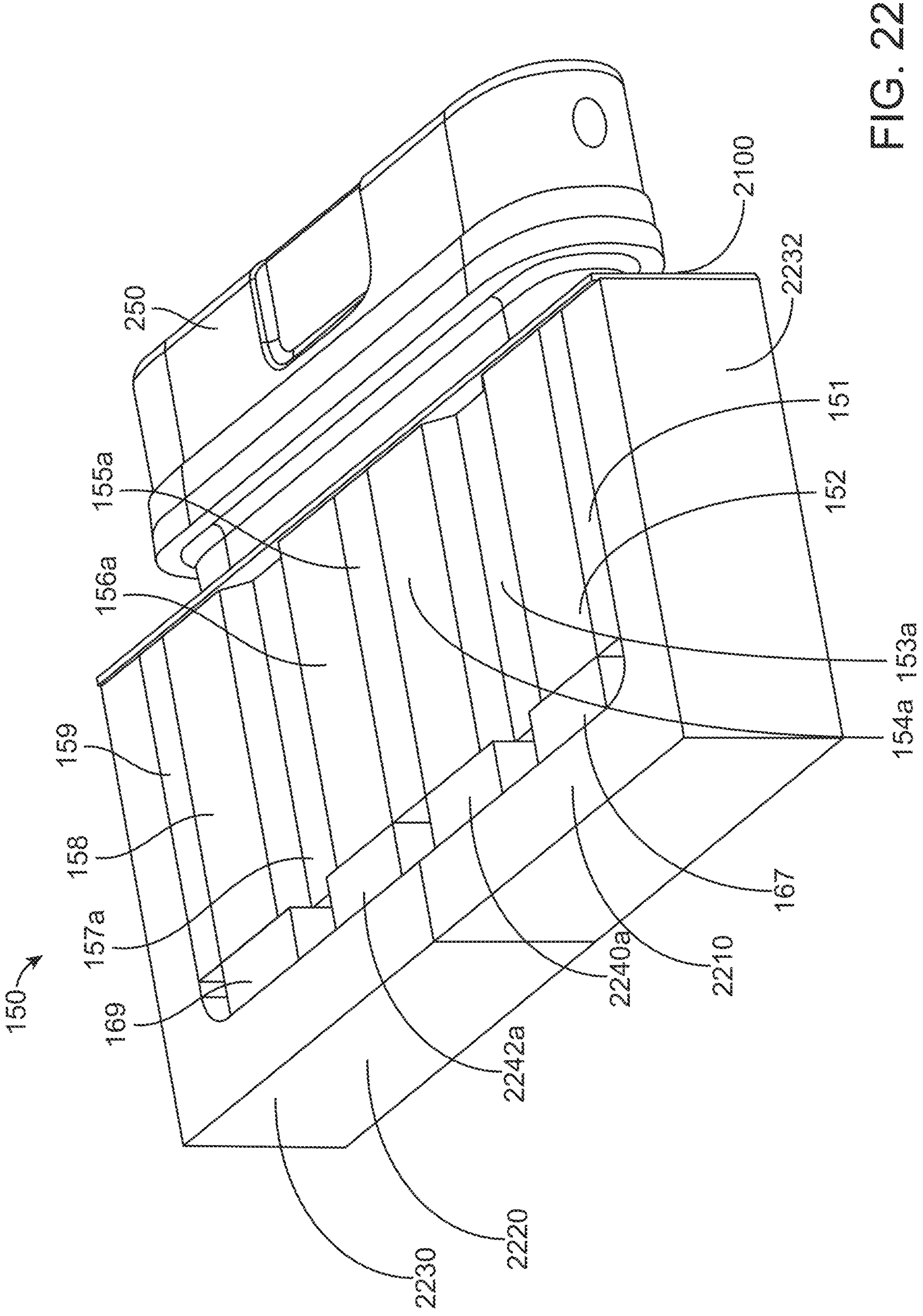
FIG. 22 illustrates a magnetic circuit according to an embodiment of the present invention.

FIG. 22 illustrates a magnetic circuit according to an embodiment of the present invention. Magnetic flux generated by magnet array 150 can be guided by one or more magnetic elements. In this example, the magnetic flux generated by magnet array 150 can be guided by magnetic element 2210 and magnetic element 2220. In these and other embodiments, magnetic element 2210 and magnetic element 2220 can be combined into a single magnetic element, or separated into still further magnetic elements. Magnetic element 2210 and magnetic element 2220 can be positioned along a backside 2230 of magnet array 150 and to the sides 2232 of magnet array 150. These or other magnetic elements can be positioned above or below magnet array 150, or they can be omitted to reduce a thickness of the magnetic circuit. Magnetic element 2210 and magnetic element 2220 can guide field lines of magnetic flux from magnet array 150 to attraction plate 250. Magnetic element 2210 and magnetic element 2220 can reduce the reluctance of magnet array 150. That is, magnetic element 2210 and magnetic element 2220 can increase and concentrate the magnetic flux of magnet array 150 into attraction plate 250. Contacting surfaces 122 of contacts 120 (both shown in FIG. 4) can be available at a connecting face 2100 of magnet array 150 to form electrical connections with contacting surfaces 812 in opening 251 (both shown in FIG. 8) of attraction plate 250 of connector insert 200 (shown in FIG. 8.)

In this configuration, magnet 151, magnet 153*a*, magnet 153*b* (shown in FIG. 21), magnet 155*a*, magnet 155*b* (shown in FIG. 21), magnet 157*a*, magnet 157*b* (shown in FIG. 21), and magnet 159 can be positioned to provide flux into pole piece 152, pole piece 154*a*, pole piece 154*b* (shown in FIG. 21), pole piece 156*a*, pole piece 156*b* (shown in FIG. 21), and pole piece 158. The interface between each magnet and pole piece, such as first surface 2110 (shown in FIG. 21) can be increased in area, as can the thickness of each magnet. Strong rare-earth magnets can be used to further increase the flux provided by magnet array 150, thereby increasing the magnetic attraction between magnet array 150 and attraction plate 250.

Additional magnets including additional magnet 167 and additional magnet 169 can also be positioned at, and coincident with, rear surfaces of pole piece 152 and pole piece 158, respectively. Further additional magnets including additional magnet 2240*a*, additional magnet 2240*b* (not shown), additional magnet 2242*a*, and additional magnet 2242*b* (not shown) can be positioned at, and coincident with, rear surfaces of pole piece 154*a*, pole piece 154*b*, pole piece 156*a*, and pole piece 156*b*, respectively. These further additional magnets can increase the magnetic flux in pole piece 154*a*, pole piece 154*b*, pole piece 156*a*, and pole piece 156*b*, thereby increasing the attraction force of magnet array 150.

Magnetic element 2210 and magnetic element 2220 can be formed of various materials. For example, magnetic element 2210 and magnetic element 2220 can be formed of a magnetically conductive material, for example a soft magnetic alloy or other magnetically conductive material, such as martensitic stainless steel, ferritic stainless steel, low-carbon steel, iron-cobalt, an iron-silicon or nickel-iron alloy, or other ferro-magnetic material, or other type of material.

The configuration of this magnetic circuit including magnet array 150 can vary in these and other embodiments of the present invention. For example, attraction plate 250 can be formed of a pole piece and magnet assembly similar to magnet array 150. Different numbers of pole pieces and magnets can be used. For example, one, two, or more than two permanent magnets can be used. Additional magnet 167, additional magnet 169, additional magnet 2240*a*, additional magnet 2240*b*, additional magnet 2242*a*, and additional magnet 2242*b* can be included or omitted, as can magnetic element 2210 and magnetic element 2220. Also, the relative thickness and dimensions of the pole pieces and magnets can vary. For example, pole piece 154*a*, pole piece 154*b*, pole piece 156*a*, and pole piece 156*b* can be narrower or shorter than magnet 153*a*, magnet 153*b*, magnet 155*a*, magnet 155*b*, magnet 157*a*, and magnet 157*b*. Alternatively, magnet 153*a*, magnet 153*b*, magnet 155*a*, magnet 155*b*, magnet 157*a*, and magnet 157*b* can be narrower or shorter than pole piece 154*a*, pole piece 154*b*, pole piece 156*a*, and pole piece 156*b*. The same can be true for pole piece 152 and pole piece 158 as compared to magnet 151 and magnet 159.

The addition of magnetic element 2210 and magnetic element 2220 can increase the size of connector receptacle 100. Accordingly these and other embodiments of the present invention can employ alternative structures to reduce a size of connector receptacle 100. An example is shown in the following figure.

Figure 23:
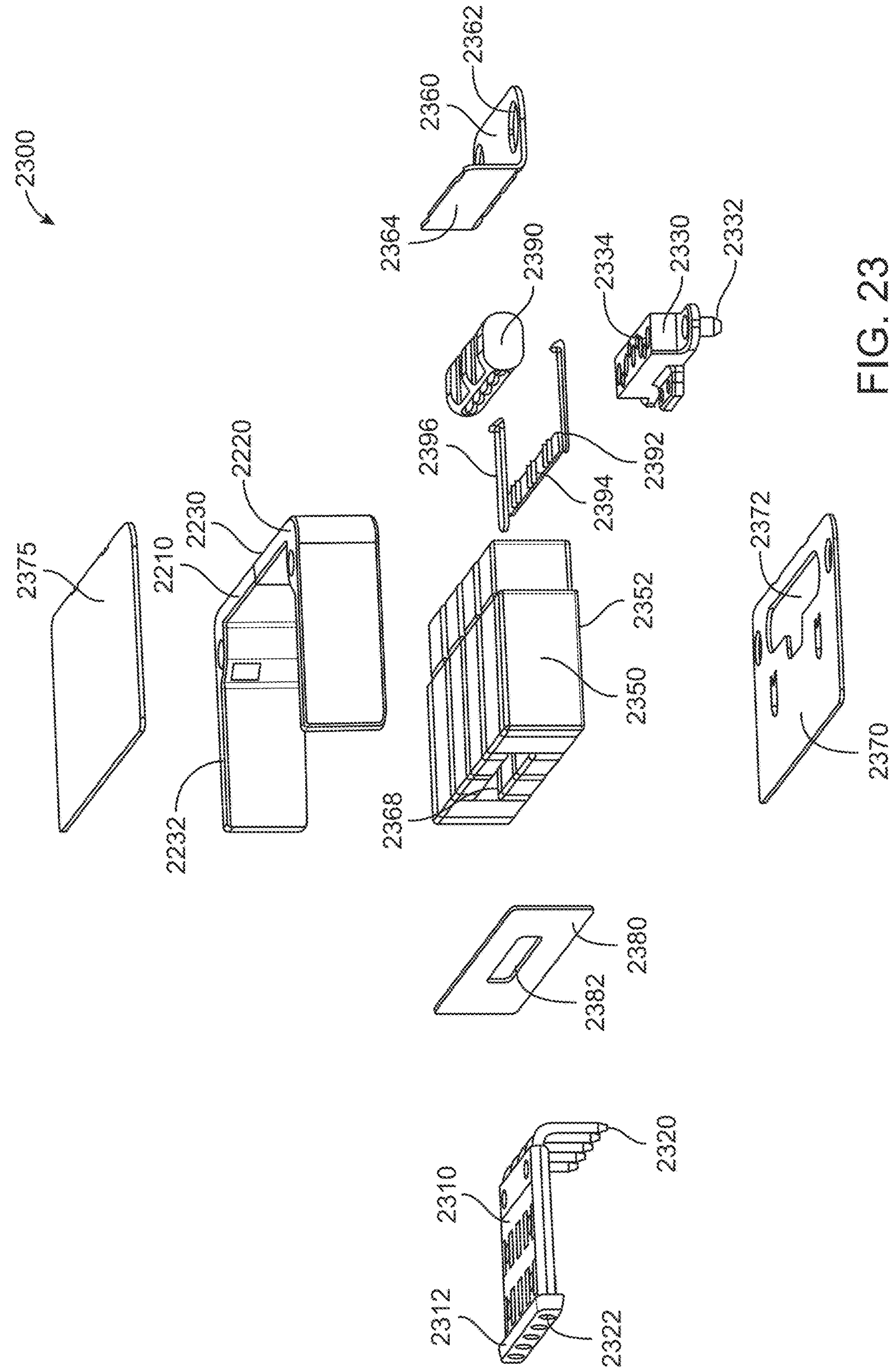
FIG. 23 is an alternative exploded view of the connector receptacle of FIG. 2.

FIG. 23 illustrates an alternative exploded view of the connector receptacle of FIG. 2. Connector receptacle 2300 can be used as connector receptacle 100 (shown in FIG. 2.) Connector receptacle 2300 can include magnet array 2350. Magnet array 2350 can be the same or similar to magnet array 150 (shown in FIG. 21), and can include or omit additional magnet additional magnet 2240*a*, additional magnet 2240*b*, additional magnet 2242*a*, and additional magnet 2242*b* (shown in FIG. 22.) Connector receptacle 2300 can further include magnetic element 2210 and magnetic element 2220. Magnetic element 2210 and magnetic element 2220 can have backside 2230 and sides 2232 around magnet array 2350.

Connector receptacle 2300 can include connector housing 2310 around contacts 2320. Connector housing 2310 can include mesa 2312. Contacts 2320 can include contacting surfaces 2322 on mesa 2312. Contact housing 2310 and contacts 2320 can be the same or similar to contact housing 110 and contacts 120 (both shown in FIG. 4.) Contacts 2320 can be further supported by housing 2330. Contacts 2320 can pass through openings 2334 in housing 2330. Housing 2330 can include posts 2332, which can fit in openings (not shown) in substrate 620 (shown in FIG. 6.)

Connector receptacle 2300 can include brackets and associated structures, such as brackets 160, slots 135, and openings 194 as shown in FIG. 5 above. When housing 2330 includes posts 2332, the adjustment provided by brackets 160 can be omitted. Instead, a single bracket 2360 can include vertical portion 2364 that can be attached to backside 2230 of magnetic element 2210 and magnetic element 2220, for example by spot or laser welding. Bracket 2360 can include openings 2362 for fasteners 610 (shown in FIG. 6) to secure connector receptacle 2300 to substrate 620 (shown in FIG. 6.) Bracket 2360 can be pre-biased (that is, sloped relative to substrate 620) as it extends away from magnetic element 2210 and magnetic element 2220. The slope can be either towards or away from substrate 620. As fastener 610 is inserted into fastener opening 630 (shown in FIG. 6) in substrate 620, for example by turning a screw used as fastener 610 into a threaded fastener opening 630, bracket 2360 can flatten (that is, become parallel to substrate 620.) This change can provide a range through which mesa 2312 of connector receptacle 2300 can be positioned in recess 113 (shown in FIG. 5.)

Connector receptacle 2300 can include further include faceplate 2380. Faceplate 2380 can include opening 2382, which can provide a passage for contact housing 2310. Mesa 2312 can be adjacent to faceplate 2380. Faceplate 2380 can be the same or similar to faceplate 180 (shown in FIG. 4.) Connector receptacle 2300 can be shielded by top cover 2370 and bottom cover 2375. Top cover 2370 and bottom cover 2375 can be formed of stainless steel or other shielding material.

Various structures and materials can be used to provide further support for contacts 2320. For example, an adhesive, epoxy, silicone, or other material can be formed or otherwise inserted around portions of contacts 2320. For example, a room-temperature-vulcanizing silicone or other silicone can form dampener 2390, which can be inserted or formed between magnet array 2350, housing 2330, contact housing 2310, magnetic element 2210, and magnetic element 2220. Dampener 2390 can reduce a vibration of contacts 2320 that can be caused by speakers, haptic components, actuators, or other components in or near electronic device 300 housing connector receptacle 2300, or by the magnetic field generated by magnet array 2350 interacting with variable current flowing through contacts 2320. The silicone for dampener 2390 can be injected through opening 2372 in top cover 2370. Alternatively, dampener 2390 can be formed ahead of time and slid over contacts 2320.

Other dampeners can be utilized for noise reduction and the protection of magnet array 2350. For example, silicone strips 2392, 2394, and 2396 can be positioned between a top surface 2352 of magnet array 2350 and top cover 2370. Top cover 2370 and bottom cover 2375 can attach to magnetic element 2210 and magnetic element 2220, for example using spot or laser welding. Silicone strips 2392, 2394, and 2396 can be used to consume the vertical space between top cover 2370 and bottom cover 2375 that is not used by magnet array 2350. Silicone strips 2392, 2394, and 2396 can prevent vibration between top cover 2370 and magnet array 2350, and between bottom cover 2375 and magnet array 2350. Silicone strips 2392, 2394, and 2396 can be formed ahead of time and placed on top surface of magnet array 2350 and then covered by top cover 2370, or silicone in the pattern of silicone strips 2392, 2394, and 2396 can be dispensed on top surface 2352 of magnet array 2350 and then covered by top cover 2370 during assembly. Alternatively, silicone strips 2392, 2394, and 2396 can be formed ahead of time and placed on top cover 2370, which can then be placed against top surface 2352 of magnet array 2350, or silicone in the pattern of silicone strips 2392, 2394, and 2396 can be dispensed on top cover 2370, which can then be placed against top surface 2352 of magnet array 2350 during assembly. Additional dampers (not shown) can be located between magnet array 150 and bottom cover 2375.

As before dampeners can be positioned between contact housing 2310 and magnet array 2350 to protect magnet array 2350 and to reduce vibration. For example, silicone can be placed or formed along sides of contact housing 2310 to form dampeners, such as dampener 117 and dampener 119 (shown in FIG. 4.) Additional dampeners (not shown) can be include along top and bottom sides of contact housing 2310. The silicone or other material for dampener 117 and dampener 119 can be formed ahead of time and placed in the desired location. The silicone or other material for dampener 117 and dampener 119 can instead be injected between contact housing 2310 and magnet array 2350 and cured in place.

While embodiments of the present invention can provide connector inserts and connector receptacles for delivering power, these and other embodiments of the present invention can be used as connector receptacles in other types of connector systems, such as connector systems that can be used to convey power, data, or both.

In various embodiments of the present invention, contacts, shields, plungers, springs, pistons, intermediate objects, barrels, and other conductive portions of a connector receptacle or connector insert can be formed by stamping, metal-injection molding, machining, micro-machining, CNC machining, 3-D printing, or other manufacturing process. The conductive portions can be formed of stainless steel, steel, copper, copper titanium, phosphor bronze, or other material or combination of materials. They can be plated or coated with nickel, gold, or other material. The springs can be coated with parylene. The nonconductive portions, such as housings, locks, pistons, and other structures can be formed using injection or other molding, 3-D printing, machining, or other manufacturing process. The nonconductive portions can be formed of silicon or silicone, rubber, hard rubber, plastic, nylon, glass-filled nylon, liquid-crystal polymers (LCPs), ceramics, or other nonconductive material or combination of materials. The printed circuit boards or other boards used can be formed of FR-4 or other material.

Embodiments of the present invention can provide connector receptacles and connector inserts that can be located in, and can connect to, various types of devices such as portable computing devices, tablet computers, desktop computers, laptops, all-in-one computers, wearable computing devices, smart phones, storage devices, portable media players, navigation systems, monitors, power supplies, video delivery systems, adapters, remote control devices, chargers, and other devices. These connector receptacles and connector inserts can provide interconnect pathways for signals that are compliant with various standards such as one of the Universal Serial Bus (USB) standards including USB Type-C, High-Definition Multimedia Interface® (HDMI), Digital Visual Interface (DVI), Ethernet, DisplayPort, Thunderbolt™, Lightning™ Joint Test Action Group (JTAG), test-access-port (TAP), Peripheral Component Interconnect express, Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future. Other embodiments of the present invention can provide connector receptacles and connector inserts that can be used to provide a reduced set of functions for one or more of these standards. In various embodiments of the present invention, these interconnect paths provided by these connector receptacles and connector inserts can be used to convey power, ground, signals, test points, and other voltage, current, data, or other information.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A spring-loaded contact comprising:

a barrel having a front opening;

a plunger having a tip extending through the front opening and a body housed in the barrel;

a spring housed in the barrel; and an intermediate object between a backside of the plunger and the spring, where the intermediate object simultaneously contacts an inside surface of the barrel at a first location and a second location, the first location and the second location on opposite sides of the intermediate object, and wherein the first location is a first distance from the front opening and the second location is a second distance from the front opening, the first distance different than the second distance.

2. The spring-loaded contact of claim 1 wherein the intermediate object has a capsule shape.

3. The spring-loaded contact of claim 1 wherein the intermediate object has a stadium-of-rotation shape.

4. The spring-loaded contact of claim 1 wherein the intermediate object has a spherocylindrical shape.

5. The spring-loaded contact of claim 1 wherein the intermediate object has a shape defined by two hemispheres separated by a cylinder.

6. The spring-loaded contact of claim 1 wherein the first location is a first distance from the front opening and the second location is a second distance from the front opening, the first distance different than the second distance.

7. The spring-loaded contact of claim 1 wherein the inside surface of the barrel provides a first force along a first force vector against the intermediate object at the first location and the inside surface of the barrel provides a second force along a second force vector against the intermediate object at the second location, and wherein the first force vector and the second force vector are parallel and non-overlapping.

8. The spring-loaded contact of claim 1 wherein the intermediate object has a first length and the barrel has a first inner diameter, and wherein the first length is greater than the first inner diameter.

9. A connector comprising:

a magnet array comprising:

a plurality of pole pieces; and a plurality of magnets spaced apart from one another and separated by the plurality of pole pieces, wherein each pole piece is adjacent to two magnets in the plurality of magnets;

a first plurality of contacts having contacting portions at a front side of the magnet array; and a magnetic element along a back side of the magnet array, and further along a first side and a second side of the magnet array, the first side opposite the second side, the first side and the second side adjacent to the back side.

10. The connector of claim 9 wherein for each of the plurality of pole pieces, the pole piece is between and adjacent to two magnets in the plurality of magnets, wherein the two magnets have the same of either a north pole or a south pole facing the pole piece.

11. The connector of claim 10 wherein the magnet array has a central passage, the first plurality of contacts are supported by a contact housing, the contact housing passes through the central passage, and a plurality of dampeners are positioned in the central passage between the contact housing and the magnet array.

12. The connector of claim 10 wherein the magnet array is arranged as a ring and wherein the first plurality of contacts pass through the center of the ring.

13. The connector of claim 11 wherein the magnet array comprises a first pole piece having a first magnet at a first surface and a second magnet at a second surface, the first surface adjacent to the second surface; and a second pole piece having a third magnet at a first surface and a fourth magnet at a second surface, the first surface opposite the second surface.

14. The connector of claim 13 wherein the first plurality of contacts are arranged as a line of contacts, the first pole piece is at a first side of the line of contacts and the second pole piece is below the line of contacts.

15. A connector system comprising a magnetic circuit, the magnetic circuit a magnet array comprising:

a plurality of pole pieces; and a plurality of magnets spaced apart from one another and separated by the plurality of pole pieces, wherein each pole piece is adjacent to two magnets in the plurality of magnets;

a magnetic element along a back side of the magnet array, and further along a first side and a second side of the magnet array, the first side opposite the second side, the first side and the second side adjacent to the back side; and an attraction plate.

16. The connector system of claim 15 wherein for each of the plurality of pole pieces, the pole piece is between and adjacent to two magnets in the plurality of magnets, wherein the two magnets have the same of either a north pole or a south pole facing the pole piece.

17. The connector system of claim 16 wherein the magnet array and the magnetic element are housed in a connector receptacle and the attraction plate forms a face of a connector insert.

18. The connector system of claim 17 wherein the connector receptacle comprises a first plurality of contacts and wherein the magnet array has a central passage and the first plurality of contacts pass through the central passage.

19. The connector system of claim 18 wherein the connector insert comprises a second plurality of contacts, the second plurality of contacts to mate with the first plurality of contacts, wherein each of the second plurality of contacts comprises:

a barrel having a front opening;

a plunger having a tip extending through the front opening and a body housed in the barrel;

a spring housed in the barrel; and an intermediate object between a backside of the plunger and the spring, where the intermediate object simultaneously contacts an inside surface of barrel at a first location and a second location, the first location and the second location on opposite sides of the intermediate object.

20. The connector system of claim 19 wherein the intermediate object has a capsule shape.

* * * * *